United States Patent [19]

Thompson

[11] Patent Number: 5,115,938

[45] Date of Patent: * May 26, 1992

[54] CONTAINERS AND CANS AND METHOD OF AND APPARATUS FOR PRODUCING THE SAME

[75] Inventor: Mortimer S. Thompson, Maumee, Ohio

[73] Assignee: Tri-Tech Systems International, Inc., Maumee, Ohio

[*] Notice: The portion of the term of this patent subsequent to Dec. 4, 2007 has been disclaimed.

[21] Appl. No.: 347,263

[22] Filed: May 3, 1989

Related U.S. Application Data

[63] Continuation-in-part of Ser. No. 115,445, Oct. 30, 1987, Pat. No. 4,975,132.

[51] Int. Cl.$^5$ .......................... B65D 6/28; B65D 7/16
[52] U.S. Cl. .................................. 220/618; 156/69; 220/619; 220/620; 220/DIG. 16
[58] Field of Search ............... 29/506, 509, 510; 53/486; 156/69, 272.2; 220/66-68, 79, 309, 359, 240, DIG. 16, 611, 614, 618, 619, 620; 264/248, 249; 413/1, 6, 41; 229/5.5, 5.6, 5.7, 125.35

[56] References Cited

U.S. PATENT DOCUMENTS

| | | |
|---|---|---|
| 2,894,844 | 7/1959 | Shakman . |
| 3,369,694 | 2/1968 | Mauser et al. . |
| 3,385,249 | 5/1968 | Czarnecki . |
| 3,402,873 | 9/1968 | Lauterbach, Jr. . |
| 3,428,328 | 2/1969 | Shelby et al. . |
| 3,524,568 | 8/1970 | Nughes . |
| 3,543,963 | 12/1970 | Heisler . |
| 3,586,204 | 6/1971 | Roper . |
| 3,709,399 | 1/1973 | Nughes . |
| 3,977,153 | 8/1976 | Schrenk . |
| 4,083,086 | 5/1978 | Miller . |
| 4,102,467 | 7/1978 | Woodley . |
| 4,184,444 | 1/1980 | Woodley . |
| 4,333,584 | 6/1982 | Gall . |
| 4,434,964 | 11/1984 | Kawamata . |
| 4,561,555 | 12/1985 | Miller . |
| 4,626,157 | 12/1986 | Franek et al. . |
| 4,626,158 | 12/1986 | LeBret . |
| 4,667,384 | 5/1987 | Miller . |
| 4,692,132 | 9/1987 | Ikushima et al. . |
| 4,697,972 | 10/1987 | Le Bret . |

Primary Examiner—Jimmy G. Foster
Attorney, Agent, or Firm—George P. Hoare, Jr.

[57] ABSTRACT

A container or can having a body and end portion which include free ends comprising plastic materials and which are joined and sealed by cooperatively curling juxtapositioned free ends. The method end apparatus of the invention forms the body portion with an opening surrounded by a free end suitable for curling and forms the end portion with a central portion surrounded by a free end suitable for curling. The container body and end portion are joined by juxtaposing their free ends for forming a plurality of walls, then the plastic in at least one of the free ends is provided in a condition at the time of curling which allows stress and related elastic strain and memory to be imparted to the plastic, followed by curling with a curling tool to intimately engage the ends and concurrently curl the perimeters thereof into a tightly curled configuration, wherein at least the one free end includes internal stress and related strain and memory for providing a seam of integrity and reliability.

49 Claims, 10 Drawing Sheets

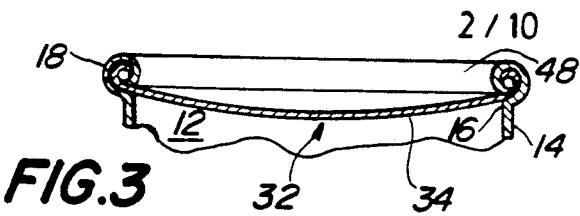
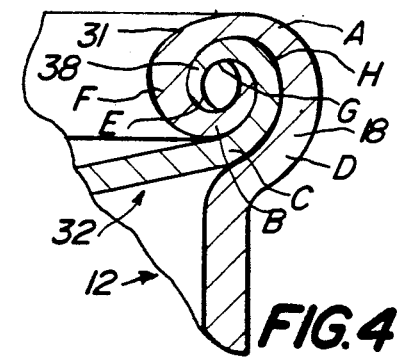
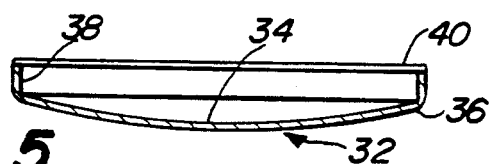
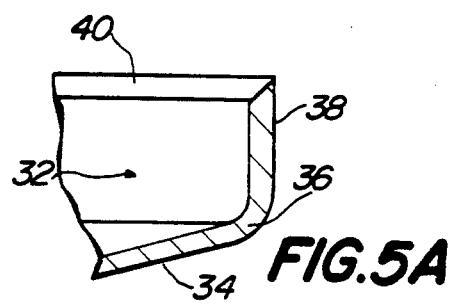
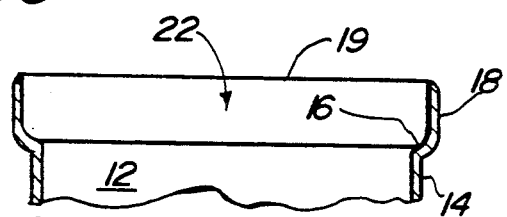
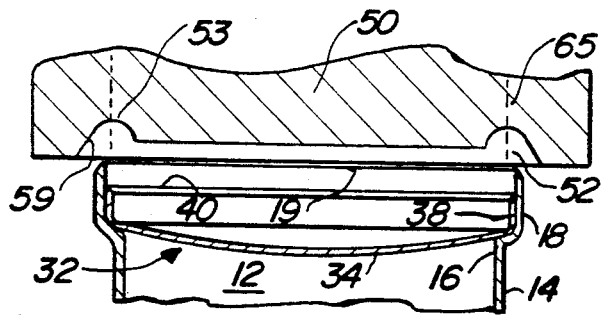
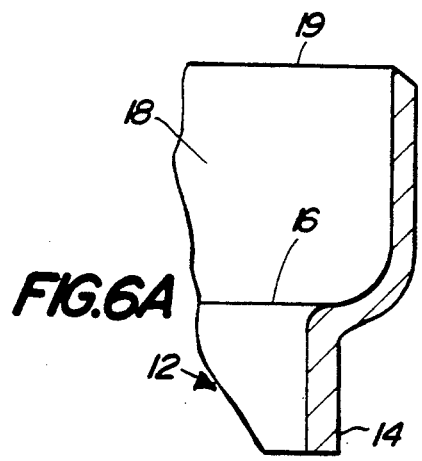
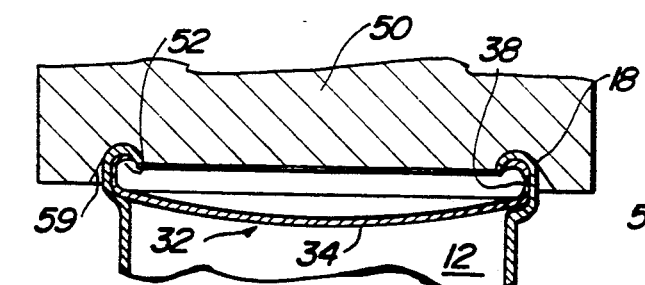
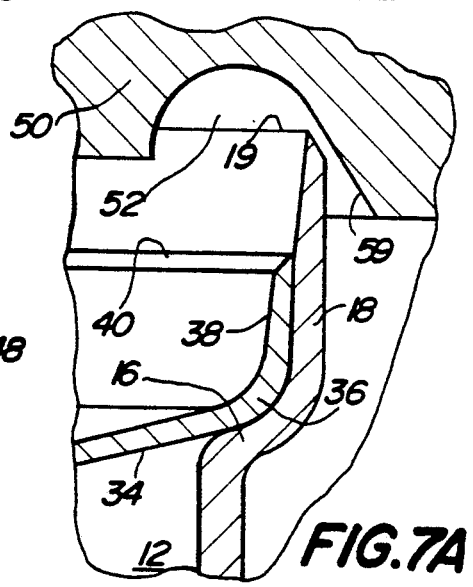
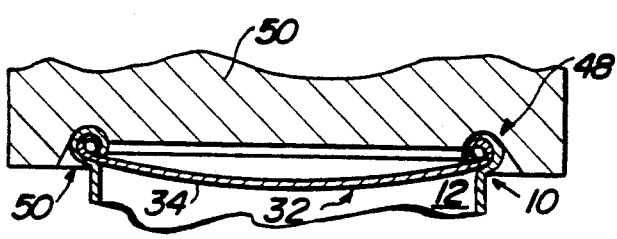

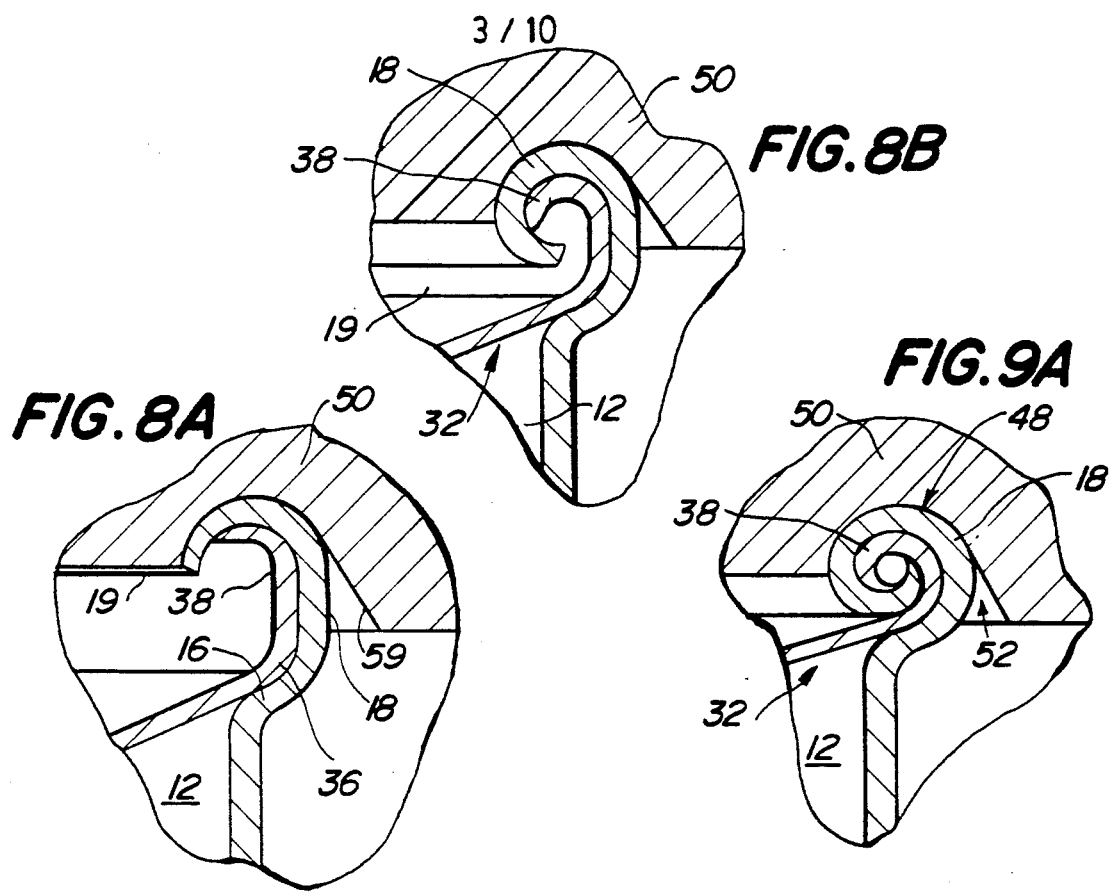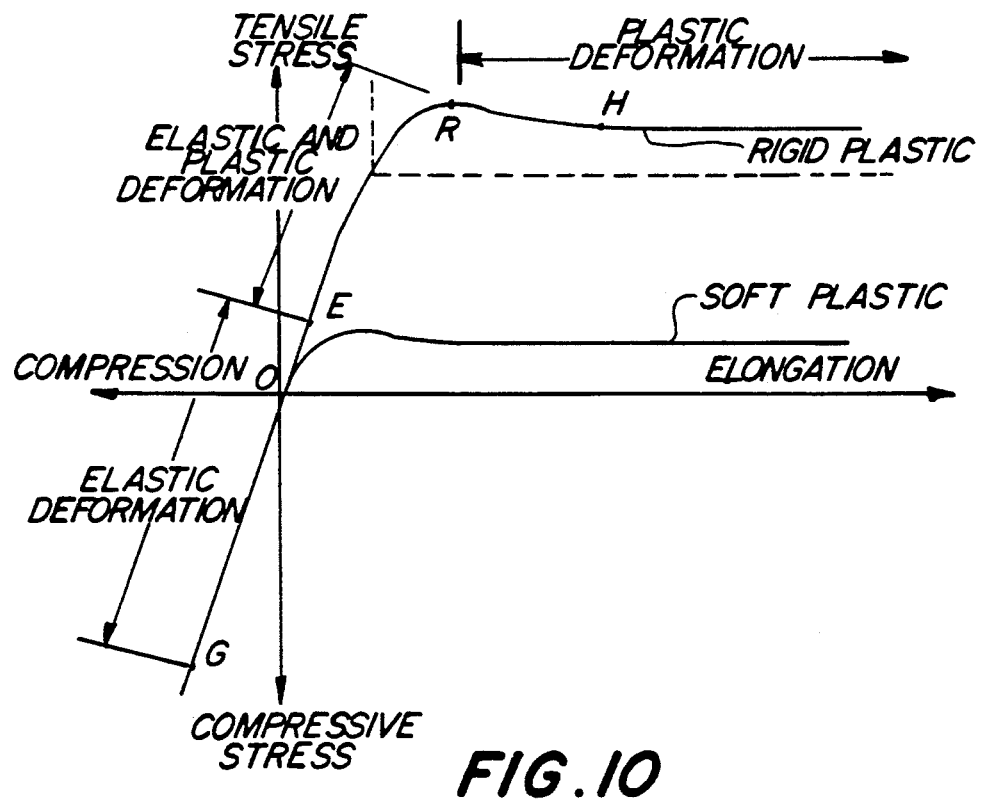

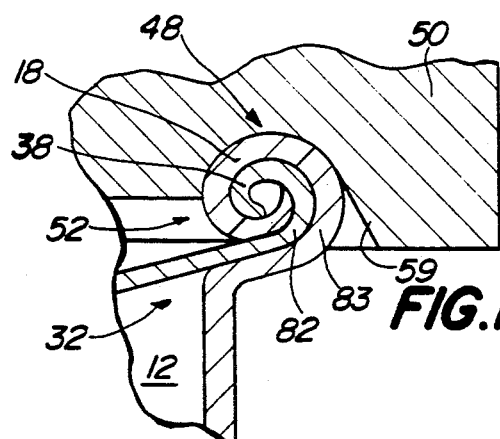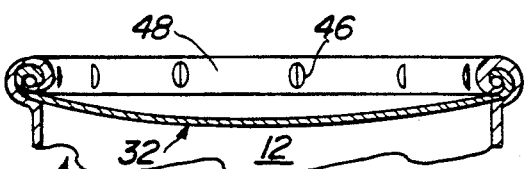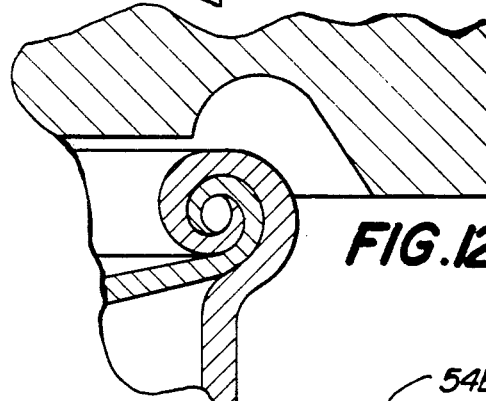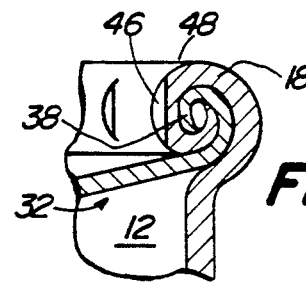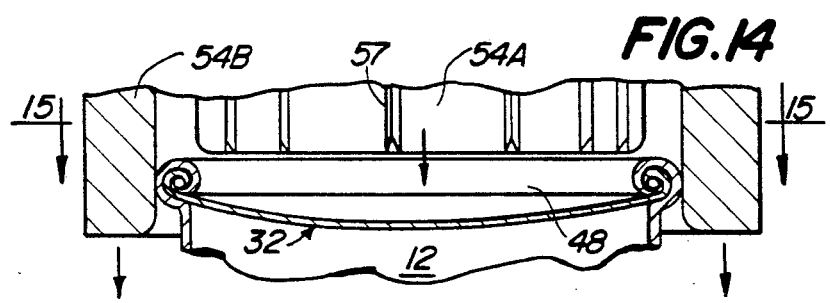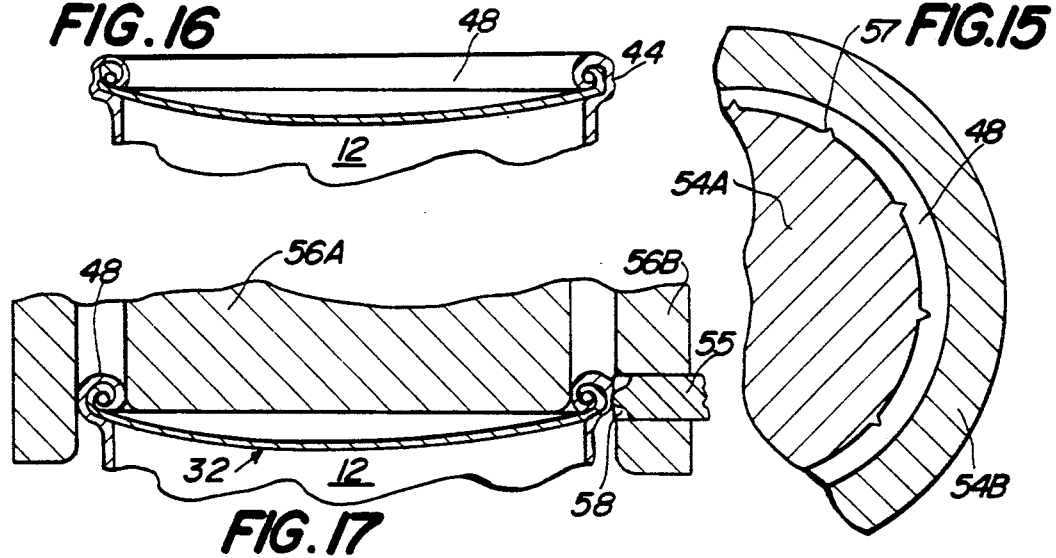

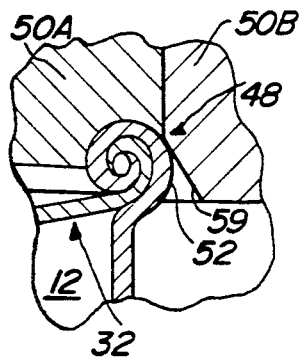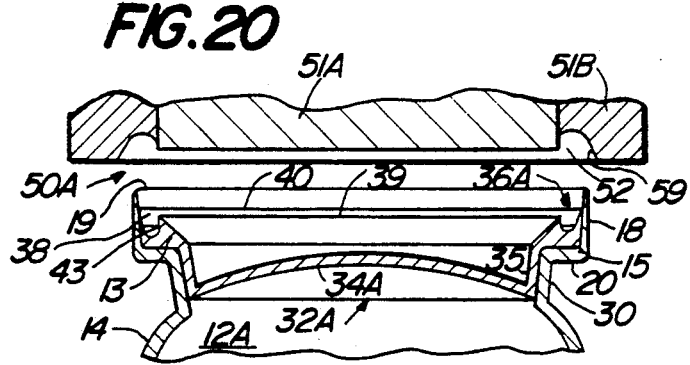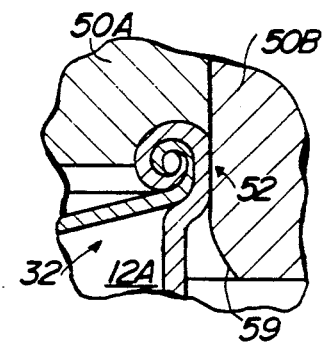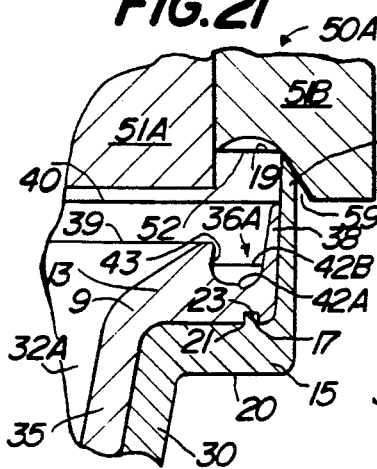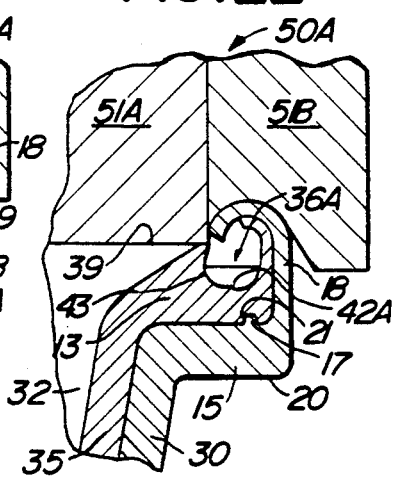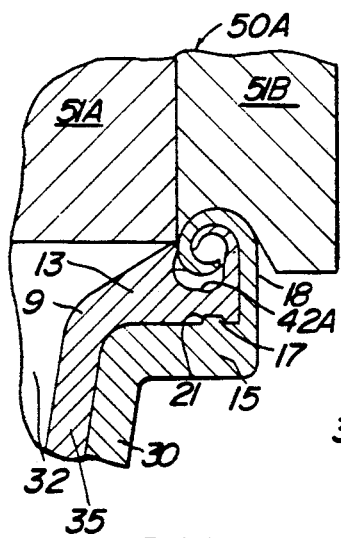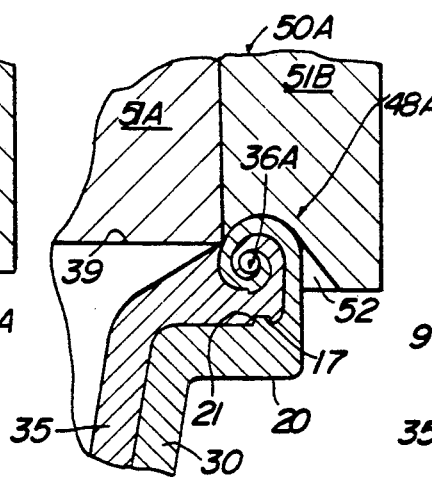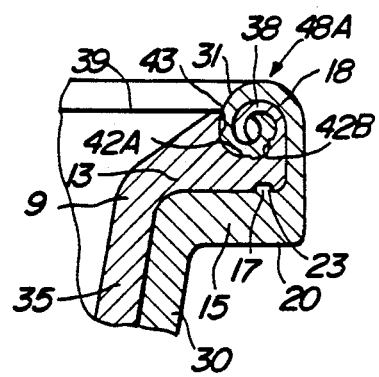

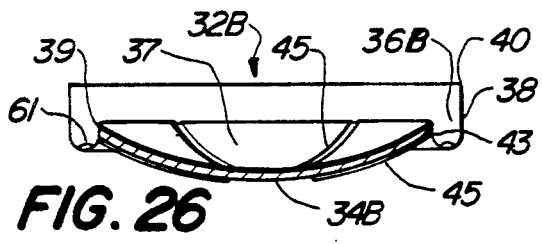
FIG. 26
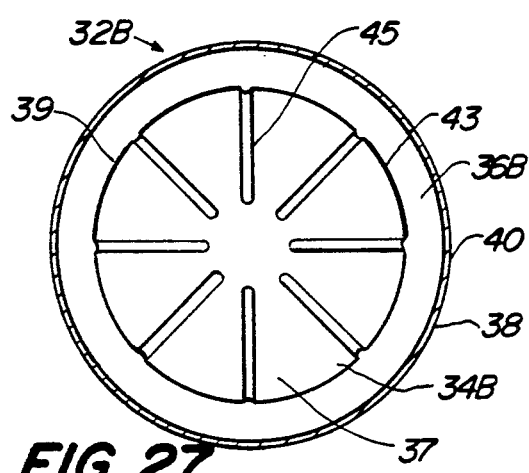
FIG. 27
FIG. 28
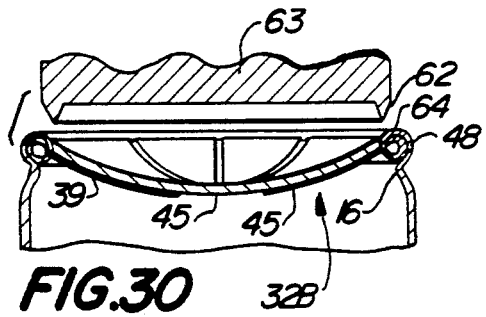
FIG. 30
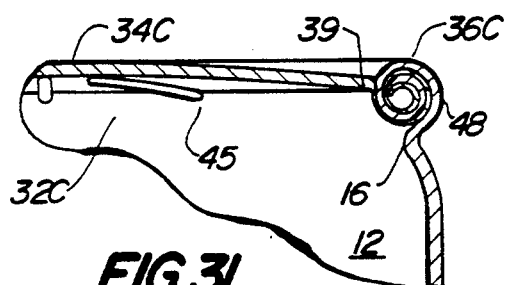
FIG. 31
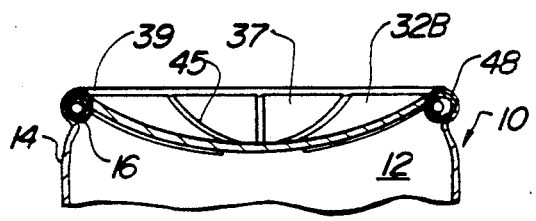
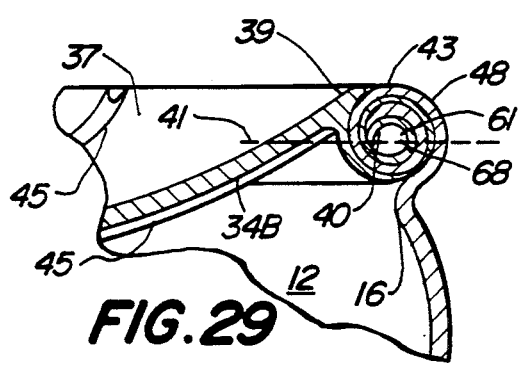
FIG. 29
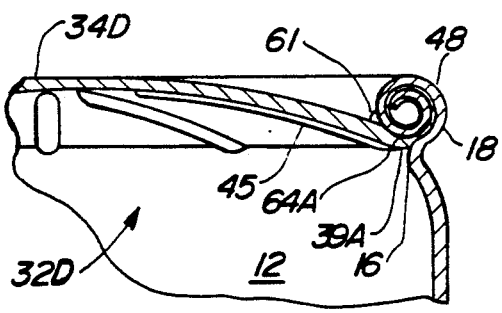
FIG. 32

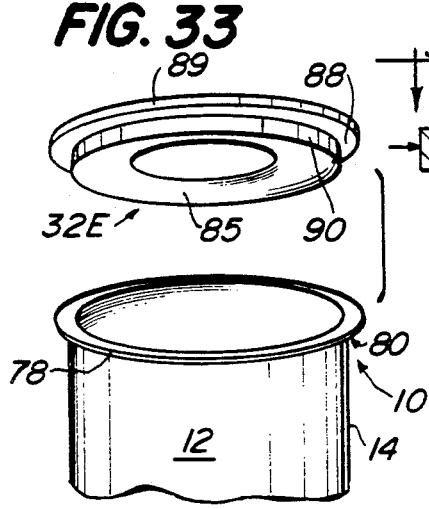
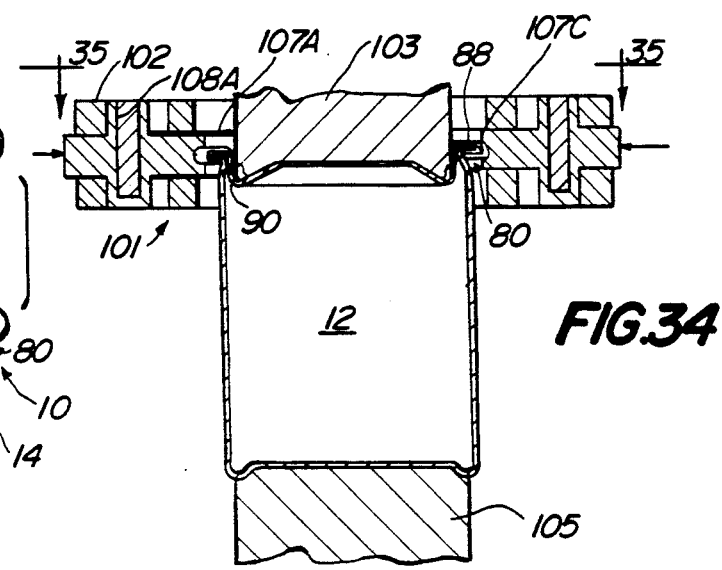
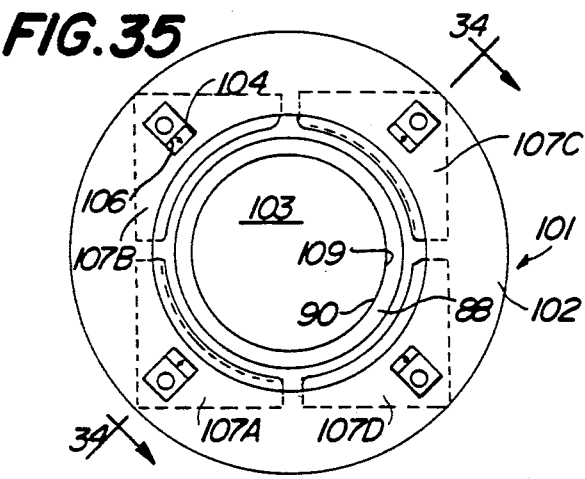
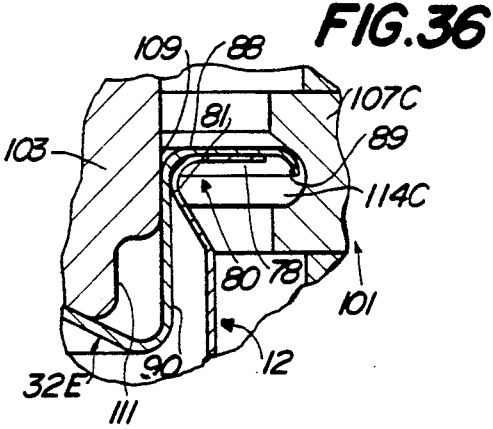
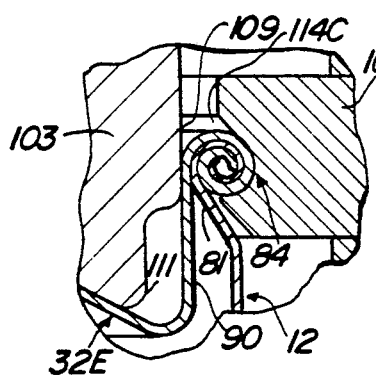
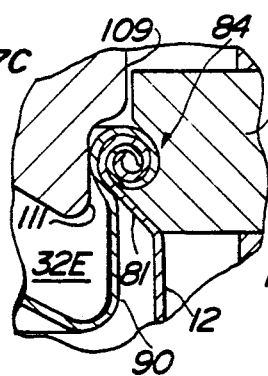

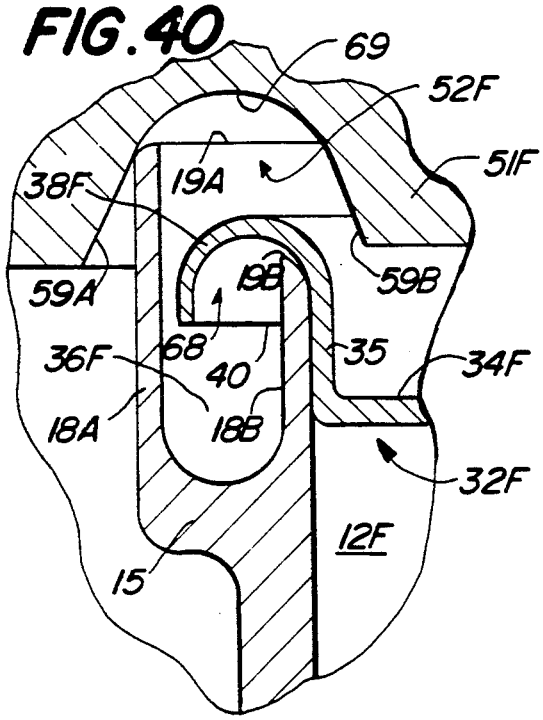
FIG.40
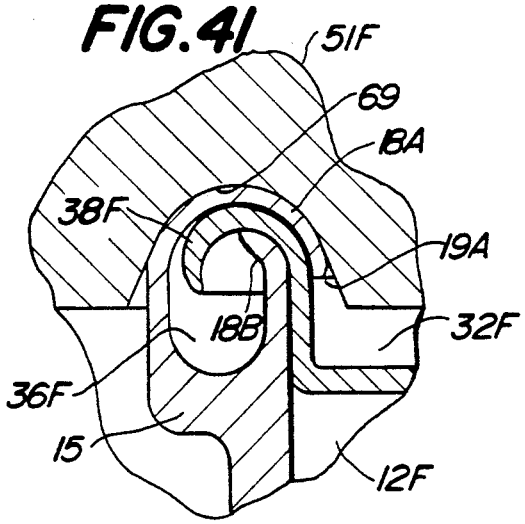
FIG.41
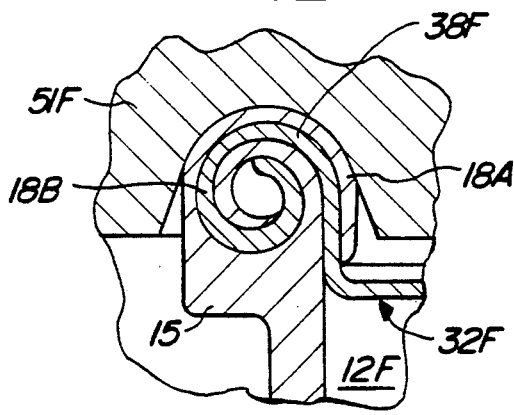
FIG.42
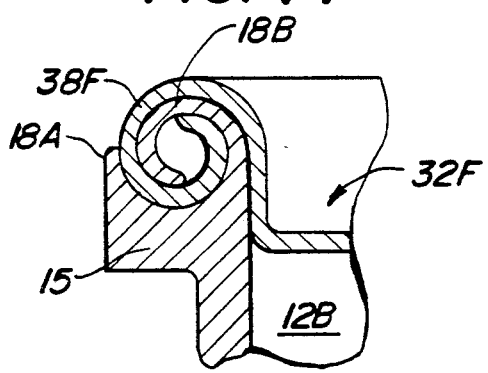
FIG.44
FIG.43

CONTAINERS AND CANS AND METHOD OF AND APPARATUS FOR PRODUCING THE SAME

CROSS-REFERENCE TO RELATED APPLICATIONS

This is a continuation-in-part of U.S. Pat. application Ser. No. 115,445, filed Oct. 30, 1987, U.S. Pat. No. 4,975,132.

FIELD OF THE INVENTION

This invention relates to a container having a seam of curled walls, wherein the walls contain plastic materials, and to a method of and apparatus for forming the same. More particularly, this invention relates to a plastic container or can bodies and ends and to methods of and apparatus for forming the same.

BACKGROUND OF THE INVENTION

The need for all plastic containers and cans has been recognized more and more as environmental concerns grow and new technologies are finding acceptance in the marketplace. For instance, recycling of packaging materials has imposed restrictions on those packages consisting of more than a single material wherein the various components cannot be easily separated in the recycling process. As a result, cans of aluminum are considered satisfactory but cans of plastic which are closed by metal ends or reinforcing members are not.

Also the advent of oven heating employing microwave energy introduces another problem to all-metal cans or to plastic cans with metal ends in that the metal becomes very hot and may build up a high electrical potential which can discharge or spark to other metallic surfaces including the oven walls.

Additional problems exist with food products which are heated in plastic packages during autoclaving related to the distortion of the walls or ends resulting from the higher temperatures and internal pressure buildup Since the package typically cannot be vented, care must be taken to provide and adequately control the external pressure to balance the internal pressure buildup and when concave can ends are bowed outwardly, another operation of bowing them back to their original shape may be required.

Prior to the present invention, moreover, techniques used to join metal can ends to can bodies of metal generally have been directed to rolling their free ends together sequentially around their perimeter. In one method the rolling tool first sequentially and circumferentially curls the seamed free ends together, followed by a flattening or squeezing operation to bring the curled surfaces into a more intimate engagement suitable for sealing. Without the latter operation the curls produced are not tight enough to make a good seal. In another method rolling tools directly but still sequentially and circumferentially fold the free ends in separate operations into a tight flattened shape suitable for sealing without a prior curling operation.

In one effort to form plastic cans Heider et al (U.S. Pat. No. 3,543,963) discloses a seamed plastic can end and plastic can body sequentially and circumferentially folded, bent and reshaped by a sequential rolling and folding process. This is relatively complicated and cumbersome and can be time consuming. Further it appears the technique proposed by the Heider et al in 1970 has not met with commercial acceptance.

In another effort, at about the same time, Shelby et al. (U.S. Pat. No. 3,428,238) disclosed a seamed plastic can end and plastic can body. In the Shelby et al. technique the curled seam produced between the plastic can body and plastic end portion, among other things, does not possess reliability and long term integrity, nor can they be produced economically in high speed seaming operations. In Shelby et al. the ends forming the seam are preheated to temperatures above the softening temperature of the materials employed which produce relatively limp plastic ends substantially devoid of elastic memory that are then reshaped. By this method, the curled ends of the Shelby et al. seam do not have the dynamic properties necessary for producing plastic seams of integrity and reliability especially for use with products under pressure or vacuum. Like Heider et al., the Shelby et al. technique proposed in 1969 has not met with commercial acceptance.

Rather, those in the art have had to resort to using metal can ends seamed to the free ends of plastic container bodies by folding, bending and reshaping the ends with sequential and circumferential rolling techniques.

Thus, there is a persisting need to provide satisfactory containers and cans comprising plastics, particularly at the seams formed by an end and adjacent body portion of the container which can withstand rigorous commercial application.

SUMMARY OF THE INVENTION

In accordance with the present invention, there is provided a new and unique container and method of and apparatus for producing a container which facilitates recycling afteruse, which makes it suitable for microwave heating, which allows for retorting without yielding permanent bulges, which possesses a high degree of sealing integrity for products that are pressurized or under vacuum, which can employ internal pressure or vacuum to enhance sealing integrity, which can be employed to package products at high throughput rates and which are inexpensive. The container includes a body and end portion which include free ends comprising plastic and are joined and sealed by cooperatively curling the juxtaposed ends. The container body and end portions are joined by juxtaposing their free ends so that they form a plurality of walls, then the plastic in at least one of the walls is provided in a condition at the time of curling which allows stress and related elastic strain and memory to be imparted to the plastic, followed by curling the walls with a curling tool which restrains the curl circumferentially as it is being formed to intimately engage the ends and concurrently curve the perimeters thereof to one another into a tightly curled configuration. In accordance with the method of the present invention, beneficial stresses and associated elastic strain and memory are produced in the plastic of at least one of the free ends during curling which, upon at least a partial recovery thereof, produce a tight seam and urge the free ends against one another to promote sealing integrity. The urging of the free ends against one another preferably continues subsequent to the seaming operation.

Additionally the outermost layers of the curled free ends are strengthened by orientation of the plastic in the direction of the curl.

Also the entire thickness of the curled portion of one or both of the free ends may be strengthened by developing compressive strain in the plastic in at least the hoop direction during the curling.

In addition, sealing integrity is further enhanced because the curled free ends include surfaces which are softer and more conformable as a result of the curling.

In a preferred embodiment the container is a can and the can body comprises plastic and has means to positively locate a can end comprising plastic and to restrict relative axial movement of the can end during the curling operation.

The plastic can end and/or body can have a generally "U" shaped peripheral recess adjacent to the free ends to cooperate with a die curling tool during the joining operation to produce the curled portion and/or to thereafter cooperate with the curled portion to restrict its movement or any uncurling which might result from its elastic memory, from stresses imposed by internal pressure within the can or from other sources. The can end is shaped so that a wall of the recess preferably overhangs the curled portion and expands under the influence of internal pressure to positively transmit said pressure beneficially against the curled portion to further hold it in position and maintain its joining and sealing integrity. The recess may also include projections on its wall which create cooperating indentations in the exterior surface of the curled free ends to maintain its joining and sealing integrity. Moreover, the can end may be shaped so that the same effect can be accomplished employing the external pressure developed with vacuum packed products.

In another embodiment of the invention one of the free ends is mechanically stronger than the other so that during curling the weaker of the free ends more readily conforms to it to assure a suitable seal therebetween.

In a further embodiment, the free ends have different levels of elastic strain so that there is a greater urging of one free end against the other.

In still another embodiment, to enhance the joining and maintain the sealing integrity of the curled portion, the free ends are welded together or the curled portion is crimped in a manner which will produce a shape which is stronger and more resistant to any uncurling which might occur as a result of the presence of elastic strain, internal pressure, or other influence.

Additionally, the curled free ends of the invention may be of different plastic compositions or surface texture to promote slippage therebetween during curling and a resultant greater intimacy of their interfaces for sealing, or for other purposes. Or the plastic used may be of the same composition but includes components which reduce sliding friction therebetween or otherwise alter and enhance their physical characteristics.

In addition to a free end, the wall about the opening of the can body can be configured to include a sealing surface removed from the free end. In addition to a free end and an optional recess, the can end may be configured to include a sealing surface removed from the free end and recess to coact with the can body.

In a preferred method of the invention, a can end having a peripheral recess and a free end is first inserted into an open end of a can body also having a free end thereabout so that the periphery of its lid portion abuts the inwardly projecting locating means of the can body and so that the plastic free end of the can end extends upwardly within and in juxtaposition to the plastic free end of the can body forming a double wall. Preferably the free ends form an interference fit, one within the other.

Prior to curling the juxtaposed free ends, the temperature of the plastic in at least one of the free ends is maintained below its softening temperature to enable the production of the desired characteristics in the resultant sealed joint. It has been discovered that the plastic in each free end so provided is capable of producing stress and related elastic strain and memory upon curling which is an important feature of the present invention. As a result, the plastic comprising at least one of the free ends must be available at the initiation of curling in a condition so that upon curling that free end has the dynamic properties required to produce a seam of integrity and reliability. In the preferred embodiment being described, each free end has the recited properties.

The two can portions are then joined and sealed by a die curling tool which preferably engages the breadth or periphery of the free ends in vertical compression at the same time so that the free ends are continually restrained circumferentially while the curl is being produced so that uncurling of the resultant curl is prevented. The curling tool then turns them inwardly or outwardly and then downwardly, channeling and altering the direction of such movement over its working surfaces. The curling action at this point produces an inverted "J" or "U" shape in the free ends. To complete the coiled or curled shape, after leaving the working surface of the tool, the free ends of plastic turn back toward themselves which results firstly from the continuing compression, combined with the elastic recovery resulting from the stresses and associated elastic strain and memory caused by curling which is made possible because the free ends prior to curling are below their softening temperature and secondly from the shape of the can end recesses. Further compression causes the free ends to continue to curl until a tight coil has been permanently formed within the peripheral recess of the can end where it is held in place by the wall of said recess. Preferably the width of the recess is slightly less than or about the same as the width of the curled free ends formed without such a coacting recess and before withdrawal of the curling die and any subsequent recovery or uncoiling which could take place resulting from elastic memory. In this manner the recess serves to maintain the tightness of the curling radius while allowing the full development of sealing integrity brought about by the creation of elastic strain. Preferably the working surfaces of the curling tool are curved but a plurality of flat surfaces may be used. In addition to vertical compression by a vertically acting die, the method of the invention includes an embodiment, wherein the free ends of the invention can be generally radial or horizontal and the curling die may compress and curl the free ends in a generally radial or horizontal direction, preferably employing a segmented die.

Also, the temperature of the outer free end prior to curling may be at or above the softening temperature while the inner free end is below such temperature to produce a differential in elastic strain between free ends resulting from curling which urges one against the other.

Further, the free ends may be heated by the working surfaces of the curling tool during curling to facilitate the curling of stiff plastics and/or thick free ends at reasonable compressive force or to preferentially heat the outer plastic free end to reduce its elastic memory so that the inner plastic free end will have a relatively greater amount of residual elastic memory and therefore constantly urge itself against the opposing free end in an intimate sealing engagement.

Additionally, the curling cycle of the heated tool may include a period of dwell on the completed curled portion following the stroke to reduce the elastic strain and memory in the outer free end at the area of tool contact by accelerating stress relaxation thereat.

In the practice of the invention at least one free end including plastic is at an effective temperature at the time of curling for producing the desired stress and related elastic strain and memory, surface softening and toughening of the invention.

Also the working surface of the tool can be vibrated or rotated relative to the free ends or vice versa during the curling operation to promote slippage of the outside free end over its surface or to generate heat therein to facilitate curling, to promote elastic recovery, or to enhance the curl tightness and sealing integrity. In another embodiment, the juxtaposed free ends of plastic may be welded or bonded together prior to, during or after the curling operation to provide a tighter seal. The welded or bonded area may include one or both of the lips of the free ends, the exposed crevice created by the curled portion and the can end or body after curling, or other segments of the curled portion.

In another embodiment a sealant may be applied prior to curling to the curling tool or a surface of the can end or body where it is subsequently distributed along the plastic free end interface and/or the central void region of the curled portion.

In still another embodiment the sealant may be applied to the exterior crevice formed by the curled portion with the can preferably prior to the formation of a pressure differential wherein an internal vacuum acts to pull said sealant into said crevice.

Also, the curled portion may be crimped to form a series of vertical impressions or one or more circumferential impressions around its periphery, an operation which may include heat to further "set" the resulting deformation or to weld one free end to the other thereat.

The curled joining means of the invention differ from that typically used for joining can ends to can bodies in that the interface between the can end and body free ends after curling produces an intimate sealing engagement in itself and does not rely on flattening, bending, folding or other shaping means during or after curling to do so. In the invention the integrity of the sealing engagement comes from the easy conformability of the free end surfaces because of their softer nature resulting from their being stretched while curled, and because the development of internal stress and elastic memory during curling results in a tight curl and a continuing urging of the free ends together. This may be enhanced and assured by an interfering, plug type fit of the free ends before curling. Moreover, other sealing means adjacent to or removed from the curled free end may be employed including a second cocurled portion.

The curling means of the invention can be accomplished at high rates largely because the curling of the entire circumference of the free ends takes place at the same time and because the free ends are maintained at low temperatures before curling.

BRIEF DESCRIPTION OF THE DRAWINGS

The following is a description of the accompanying drawings of illustrative embodiments of the invention. It is to be understood that the invention is capable of modification and variation apparent to those skilled in the art within the spirit and scope of the invention.

FIG. 3 is a longitudinal sectional view, of the container of FIG. 2, taken along the lines 3—3 thereof;

FIG. 4 is an enlarged detailed view of the curled free ends of the container body and end;

FIG. 5 is a longitudinal sectional view of the preform of the container end, taken along lines 5—5 of FIG. 1;

FIG. 5A is an enlarged detailed view of FIG. 5;

FIG. 6 is a longitudinal sectional view of the preform of the container end, taken along lines 6—6 of FIG. 1;

FIG. 6A is an enlarged detail of FIG. 6;

FIGS. 7-9 are longitudinal sectional views illustrating a preferred method of the invention for forming plastic containers, such as the container of FIGS. 1 to 4 wherein FIG. 7 illustrates the assembly and juxtaposition of the free ends ready for engagement by the die curling tool, wherein FIG. 8 illustrates the concurrent engagement between the die curling tool of the perimeters of the free ends and the curling of the engaged free ends by the die, wherein FIGS. 8A and 8B are enlarged detailed views of the engagement between the die curling tool and the free ends, wherein FIG. 9 illustrates the completion of the concurrent curling of the perimeters of the free ends by the die tool method of the present invention, and wherein FIG. 9A is an enlarged detail view at FIG. 9;

FIG. 10 is a stress strain graph for the stresses in the curled free ends shown in FIG. 10;

FIGS. 11 and 12 are enlarged detail views of another embodiment of the invention employing an annular groove in the curling die of a larger diameter than in FIGS. 6-8 for curling the free ends with stressed uncurled portions;

FIG. 13 is a longitudinal section view of another embodiment of the invention, wherein the curled free ends have been crimped;

FIG. 13A is an enlarged detailed view of the curled and crimped ends of the container of FIG. 13;

FIG. 14 is a longitudinal sectional view illustrating a preferred apparatus and method of the invention for crimping and curled free ends of a container, such as illustrated in FIG. 13;

FIG. 15 is a cross sectional view of the crimping apparatus of FIG. 14, taken along the lines 15—15 thereof;

FIG. 16 is a longitudinal view of still another embodiment of the invention, wherein the curled free ends have been creased;

FIG. 17 is a longitudinal sectional view, illustrating a preferred embodiment of the apparatus and method of the invention for creasing the curled free ends of the containers of the invention;

FIG. 18 is an enlarged and detailed longitudinal sectional view of still another embodiment of the invention, illustrating a preferred embodiment of the apparatus and method of flattening the curled free ends of the containers of the invention;

FIG. 19 is similar to FIG. 18 and illustrates how the curled ends are flattened by the apparatus and method the invention;

FIGS. 20-25 are longitudinal sectional views of another embodiment of the invention for forming a container, such as the container shown in FIG. 2, which includes in this embodiment a well means in the container body, wherein FIG. 20 illustrates the assembly and juxtapositioning of the free ends ready for engagement by the die curling tool; wherein FIG. 21 illustrates the initial engagement between the curling tool and the free ends, wherein FIGS. 22-24 illustrate the curling of the free ends by the curling tool, and wherein FIG. 25 illustrates the completion of the curling of the free ends;

FIG. 26 is a longitudinal sectional view of another embodiment of the container end of the invention for dynamically maintaining the curled free ends of the invention;

FIG. 27 is a plan view of the container end of FIG. 26;

FIG. 28 is a longitudinal sectional view of the container end of FIGS. 26 and 27 assembled with a container body and forming therewith the double wall curl of the present invention;

FIG. 29 is an enlarged detailed view of FIG. 28 illustrating that a sealant also can be used to maintain the double wall curl of the containers of the present invention;

FIG. 30 is a longitudinal view of another embodiment of the invention illustrating a preferred embodiment of an apparatus and method the invention for welding the double wall curled free ends of the containers of the invention;

FIG. 31 is an enlarged partial and longitudinal sectional view of a container including the double wall curled free ends of the container body and end having a cover lid which can be flexed inwardly in vacuum packaging;

FIG. 32 is similar to FIG. 31, wherein a sealant is provided between adjacent lid and the curled free end portion of the container body;

FIG. 33 is by exploded perspective view of still another embodiment of a preform of the invention, wherein the free ends are generally radial or horizontal to the longitudinal or vertical axis of the container;

FIG. 34 is a longitudinal sectional view of which illustrates the assembly and horizontal juxtaposition of the free ends of the container body and end of FIG. 33 ready for engagement by a segmented radial die curling tool;

FIG. 35 is a plan view of FIG. 34;

FIGS. 36-39 are enlarged longitudinal sectional views of the container and die of FIGS. 33-35 wherein FIG. 36 illustrates initial engagement between the free ends and the curling tool, wherein FIG. 37 illustrates the completion of the curling of the free ends by the curling tool, wherein FIG. 38 illustrates the stressing of adjacent uncurled portions of the free ends by the curling tool, and FIG. 39 illustrates the completed formation of the curled stressed free ends after removal of the curling tool;

FIGS. 40-43 are enlarged partial and longitudinal sectional views of another embodiment of the invention including a three wall free end configuration, wherein FIG. 40 illustrates the initial engagement between the free ends and a curling tool, wherein FIGS. 41-42 illustrate the formation and completion of the curled three wall structure of the free ends of the container body and end, and wherein FIG. 43 illustrates the completed curled three wall structure of the free ends after removal from the curling tool;

FIG. 44 is similar to FIG. 43, except a portion of the outermost curled free end has been removed;

FIGS. 45-48 are enlarged partial and longitudinal sectional views of still another embodiment of the invention including two curled portions wherein each portion includes a plurality of curled free ends, wherein FIG. 45 illustrates the completed two curled portions, and FIGS. 46-48 illustrate the formation of the two curled portions by intergagement between the free ends and a curling tool;

GLOSSARY OF TERMS

Prior to describing the illustrative embodiments of the invention, in detail, a number of words and phrases used throughout the application are next reviewed.

Stress refers to the force(s) remaining within an article and distributed over a cross section area thereof, including internal stress.

Stress relief refers to the decay of internal stress(es) imposed by a curling action, including short term decay which can occur during such curling and is manifested as a deformation until restrained, and long term decay under the restraint of opposing, balancing stresses which also decay and begins upon completion of curling.

Strain or elastic strain herein refers to the deformation of a curled material which is recoverable in the absence of an opposing stress.

Elastic recovery refers to the recovering action or elastic recovering action from a curl deformation in the absence of opposing stress(es).

Elastic memory refers to the capacity of a curled article to return to its original pre-curled dimensions, including diameter or circumference (hoop dimensions) due to elastic strain.

Urging refers to a force applied by one free end upon another free end resulting from a differential in the elastic strain therein.

Softening point refers to a thermal property of plastic materials useful in this invention as measured by the Vicat test (ASTM D 1525-82), including the temperature at which a plastic material offers little or substantially no resistance to a curling deformation, and where little or substantially no resistance to said curling deformation can develop as a result of said curling. In amorphous polymers the Vicat Softening Point is close to the Glass Transition Temperature (Tg) which provides a suitable alternative reference point. In so called crystalline polymers because of their physical nature, the Glass Transition Temperature is not applicable. With crystalline polymers only the Vicat Softening Point is applicable.

DETAILED DESCRIPTION OF ILLUSTRATIVE EMBODIMENTS OF THE INVENTION

Figures 1, 2:
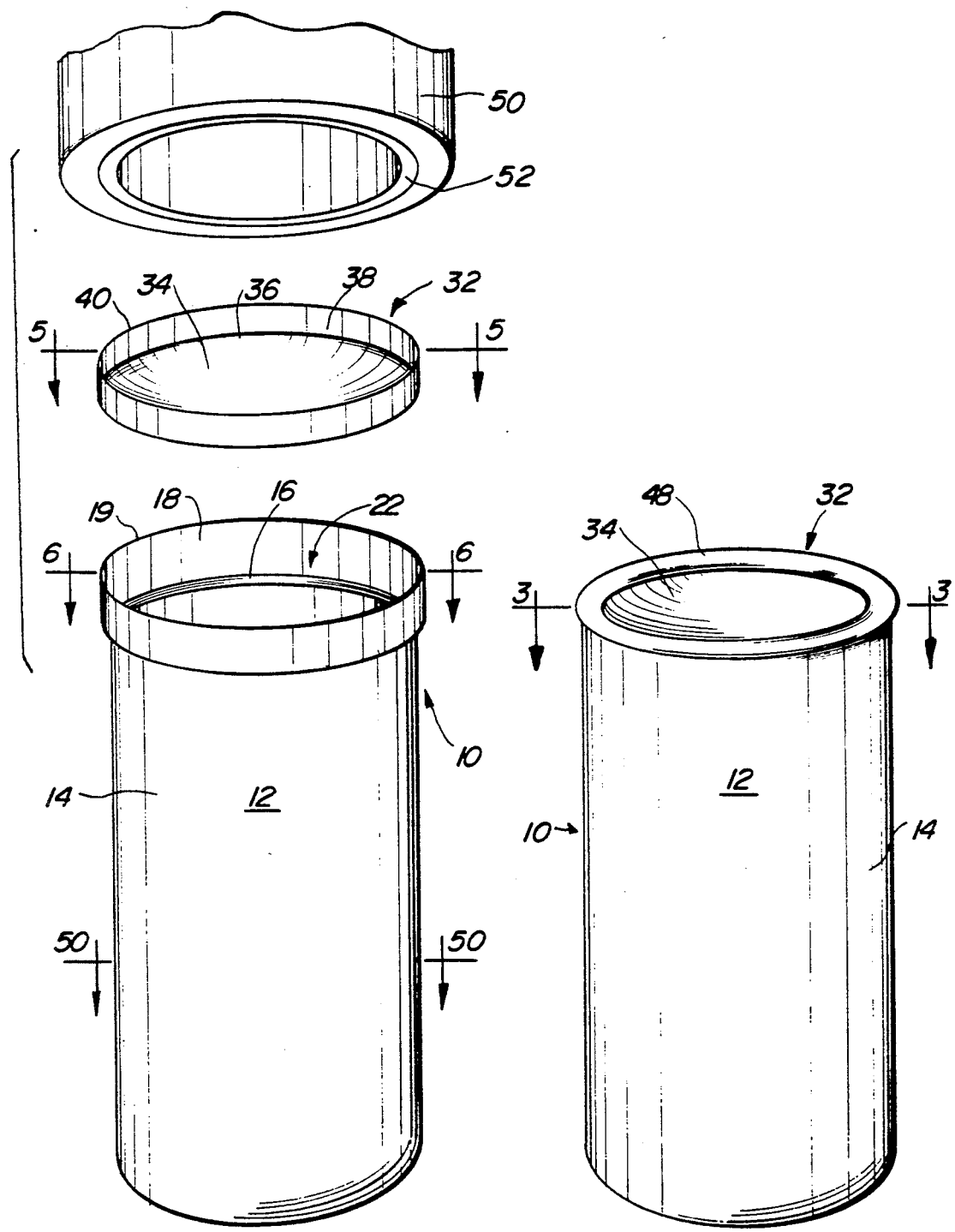
FIG. 1 is an exploded perspective view of a preferred embodiment of the preform of the invention and a preferred die curling tool of the invention prior to assembly of the illustrated plastic container and engagement by the die curling tool.
FIG. 2 is a perspective view of the container of FIG. 1 after assembly and die curling of the juxtaposed free ends of the plastic end and plastic container body.

Referring now to FIGS. 1 to 4, there is shown a container which is a can 10 having a body 12 and an end 32 of plastic The can body 12 includes a tubular wall 14, and inwardly directed ledge 16 which may be continuous or discontinuous, and a free end 18 with a lip 19 defining an opening 22. The can end 32 has an upwardly concave lid 34 with a peripheral portion 36 and an annular free end 38 with a lip 40. FIGS. 2-4 show the can end joined to the can body in a sealing engagement created by tightly curling their juxtaposed free ends 18 and 38 into a double wall curled or coiled portion. FIGS. 5 to 6A show the respective can end 32 and can body 12 prior to assembly and joining, wherein the free end 38 and 18 are tapered to facilitate curling.

As shown in FIGS. 5 and 6, there is a taper in the free ends 18 and 38 extending from their lips 19 and 40 which facilitates the initiation of curling them. The taper preferably extends from lips 19 and 40 for a distance sufficient to assure a full round curve to the curl 48 adjacent its lips 19 and 40 and to program the development of compressive stress on the free ends 18 and 38 to avoid their collapse during short curling cycles. For a typical curl 48 of the invention having a width of 0.070 to 0.100 inches, the taper may be sharp and extend a distance of about 0.050 inches from the lips 19 and 40 or they may be gradual and extend the whole length of the free ends 18 and 38 or both. Typical average thicknesses of the free ends 18 and 38 range between 0.003 and 0.025 inches. As shown in FIGS. 5 and 6, the free ends 18 and 38 are free of abrupt changes in thickness.

As illustrated in FIGS. 7 and 7A, the length of can end free end 38 is preferably less than that for body free end 18 because the curling of both free ends produces more wrap or coiling with the lesser radius curl of free end 38 and also it is desired in this embodiment that the free end 38 be curled to less than a full curl so that residual elastic strain and memory will urge it against the curled body free end 18 as will be discussed in FIG. 9.

Referring to FIGS. 1 and 7 to 9A, there is shown a preferred method and apparatus for joining the can end 32 and can body 12 with the die curling tool 50. In general, the can end 32 and can body 12 are first assembled with the free ends 38 and 18 in juxtaposition. The properties of the plastic in the free ends 38 and 18 which result in a plastic seam of integrity and reliability are then made available at least at the time curling is initiated, followed by cooperatively curling the free ends 38 and 18 while imparting the desired stress and related strain and memory, to thereby produce the seam required for a plastic can 10.

As shown in FIG. 1, the can end 32 and can body 12 are ready for assembly and the die curling tool 50 is ready to engage and curl the assembled double wall free ends 18 and 38. In FIGS. 7 and 7A the can end 32 has been assembled with the can body 12 ready for curling by positioning it into the can body opening 22 so that the lid peripheral portion 36 rests against the can body ledge 16 and its free end 38 is in juxtaposition with and within the can body free end 18. Preferably the free ends 18 and 38 are in an interfering and sealing engagement along their full length and may include a snap-fit engagement. Positioned directly above the annular free ends 18 and 38 is the tool 50 having an annular groove 52 with a concave cross section suitable for producing the curled portion 48.

Preferably, prior to joining and sealing of the can end 32 to the body 12, the free ends 38 and 18 are at ambient temperatures to provide the desired physical characteristics for producing the desired curled shape of the free ends 38 and 18. However, when the free ends are of materials or thickness which present problems in forming the desired curl, they may be preheated to higher temperatures Under such circumstances the free ends 38 and 18 should not be preheated to as high as its Vicat Softening Point. Beyond this point subsequent processing of the free ends does not produce the desired properties in the completed container.

More particularly, in the practice of the present invention, it has been discovered that certain properties or characteristics in the plastic of at least one free end must be present when curling is initiated to facilitate the curling process as well as the long term sealing integrity of the resultant curled free ends.

One required property is the ability to produce elastic memory or the capacity to essentially return to its original pre-curled dimensions and geometry. The presence of this dynamic property at the time curling is initiated is important to obtaining the desired subsequent sealing integrity and reliability of the invention because it is employed first to produce a tightly coiled configuration and secondly to thereafter: produce a positive urging of one free end against the other. Without this property when curling commences, the desired results can not be achieved.

Another desired characteristic of the polymer during curling is the tendency for the molecular chains to orient. The existence of this property at the time curling is initiated allows subsequent processing to orient molecular chains of the polymer in a manner which strengthens the resultant curled seam.

A third desired property of certain polymers which should be present at the time curling is initiated is the ability to produce a relatively soft surface as a result of being stretched.

Each of the desired properties or characteristics of the polymer is temperature dependent with the ability to provide elastic memory, orientation and softness being optimized at the lower plastic temperature of the invention.

In the practice of the invention the plastic material of at least one free end is below its Vicat Softening Point when curling commences to thereby utilize the properties of the plastic material to obtain the benefits of the invention during curling and thereafter in the resultant joint or seam of the completed container.

Plastics suitable for the practice of the invention include polyethylene terephthalate (Vicat . Softening Point of 172° F.), polypropylene (Vicat of 311° F.), polyethylene (Vicat of 172°to 284° F., depending on density) and polycarbonate (Vicat of 300° to 316° F.). Other useful polymers include polystyrene, acrylonitrile polymers, nylon, acetal polymers, polyvinyl chloride and other semi rigid to rigid plastics including multipolymers, polymer blends and laminar constructions of different polymers or other materials including polymers.

With the described properties being present in the plastic free ends 38 and 18 of the illustrative embodiment, and as shown in FIGS. 8 to 9, the joining and sealing operation is accomplished by pressing the groove 52 of the tool 50 against the tapered lip 19 of the can body free end 18. The engagement between the walls of the groove 52 and the free end 18 occurs about its perimeter at one time so that the free ends are restrained circumferentially. In this embodiment the deepest portion 53 of the groove 52 representing the center of its concavity is located inwardly of the cylindrical plane of the free end 18. This is illustrated by the dotted lines 65 of FIG. 7. Also the groove 52 has a beveled portion 59 outwardly and tangent to its concavity to facilitate centering of the tool and can free ends. As movement of tool 50 relative to the free ends 38 and 18 continues, the free end 38 and 18 are centered within groove 52 by the slanted portion 59 and concurrently forced about each of their perimeters inwardly and then downwardly until free end 18 assumes an interim inverted shape and free end 38 is an approximate "L" shape as shown in FIGS. 8 and 8A. As this relative movement continues, with the tool 50 providing continual circumferential restraint, the annular lips 40 and 19 are forced downwardly about each of their perimeters out of the groove 52 and at the same time are forced outwardly towards their original diameter as shown in FIGS. 8B and 9 in response to the stress and associated elastic strain and memory developed therein while being shaped by the tool 50, thereby producing the desired double walled curl 48 joining and sealing the can end 32 to the can body 12.

It has been found that significant levels of curled-in stress and related elastic strain and memory in the free ends 38 and 18 facilitate their curling as well as enhance the integrity of the curled portion 48. The curling method of the invention includes the development of such stress and employs short time and low plastic temperature conditions to produce it.

Thereafter, it is the urging produced by this stress during curling which causes the unopposed free end lips 40 and 19 to turn back toward their original hoop dimensions when they leave the groove 52 of the curling tool 50, as shown in FIG. 8B. Then, as shown in FIGS. 9 and 9A, as the stroke of tool 50 continues, the free ends 38 and 18 continue to be expressed from the groove 52, and the lip 40 of the body free end 18 continues to curl until it contacts the can end free end 38 and slides in intimate contact against it until the stroke of tool 50 is complete. Thus the stresses and related elastic strain and memory produced by the curling method of the invention are employed to urge the free ends into a coiled configuration.

While the curled portion 48 is being formed, the high levels of curled-in stress of the invention also create positive forces urging the free ends 38 and 18 together as they are sliding upon and curling around each other, thereby creating intimate interfacial contact between them. Subsequently, when the tool 50 is removed, the curled free ends 38 and 18 are left with a continuing significant level of stress therein which continues to urge the curled free ends together to provide enhanced sealing integrity during package distribution and use. The urging is derived from stresses and related elastic strain and memory in the curled free ends 38 and 18 resulting from the high levels of curling deformation both in the direction of curl and in the hoop or circumferential direction. In the hoop direction all of the curled portion of the body free end 18 has stresses and elastic memory which seek to force it radially outwardly to its original hoop dimension. As illustrated in FIG. 4, segment A of the body free end 18 is restrained from such movement by attachment to the uncurled portion of free end 18 but its segment B is not and therefore it bears against the can end free end 38 along segment C of free end 38 and therethrough it bears upon its own segment D. In the hoop direction all of the curled portion of can end free end 38 also wants to return to its original dimension but in the design shown in FIG. 4 its segment E does not effectively bear radially against a segment of the body free end 18 and therefore it does not contribute to urging the free ends together radially. In the curl direction the body free end 18 is curled sufficiently to produce a balance of curled-in stresses which results in a stable shape which will not uncurl. However in the curl shown in FIG. 4, the can end free end 38 is not curled to such a degree and the resultant shape does not have balanced stresses and therefore it seeks to relax said stresses by uncurling, thereby urging itself outwardly and especially upwardly and downwardly against the surrounding curled body free end 18 and its Segments A and B.

It has also been found that the curling method of the invention illustrated by FIGS. 7 to 9, which is accomplished at high rates and plastic temperatures below the softening point, also modifies the physical properties of the plastic in other ways so as to further enhance its sealing characteristics. For instance, it has been found that for certain polymers (e.g. polypropylene, polystyrene) the plastic at one surface of the free ends 38 and 18 is made softer, more conformable and tougher and at the other is made stronger and more resilient and creep resistant as a result of the stresses imposed on the plastic during the curling operation. A theory for this enhancement is explained in conjunction with reference to FIG. 10.

The curling operation, by imposing an alternative shape on the free ends 38 and 18, introduces stresses and stress differentials to the resultant curled shape across their thicknesses. That portion of the free ends which is stretched is in extension or a state of tension and that portion which is compressed is in the state of compression. The level of stress varies across the thickness with the degree of extension or compression and, as in any static condition, the total amount and direction of each kind of stress balances one another.

Balanced stresses are developed in the direction of curl as a result of the extension and compression across the thickness of the curled free end. Both the outer curled free end 18 and the inner curled free end 38 behave similarly in this regard. As shown in FIG. 4, the convex exterior surface H of curled free end 38 is stretched in the direction of the curl and is in a state of high tension. The opposite concave interior surface G, is compressed in the direction of the curl and is in a state of high compression.

In FIG. 10 there is shown a typical stress-strain curve for a semi-rigid plastic (e.g., polypropylene) suitable for the practice of the invention. The conditions of stress in the direction of curl at points H and G in FIG. 4 are shown on the curve at typical locations for the practice of the invention (5% elongation and beyond and the corresponding level of compression). The dotted lines define that portion of the stress-strain curve wherein point H, representing the stretched surface of the curled free end 38 or 18, will typically be found near to the tensile yield point R. Also shown in FIG. 10 is a typical stress-strain curve for a much softer plastic such as ethylene-vinyl acetate copolymer or polyvinyl chloride plastisol used for sealing because of their soft conformable nature. When the portion of the curve for the rigid plastic defined by the dotted lines is compared to the curve for the softer plastic, a similarity is noted wherein small amounts of stress result in large amounts of deformation which equates to the easy conformability required for sealing.

The optimum degree of softening of the stretched surface of curled free ends 38 and 18 has been shown to depend upon the method of the invention which calls for curling the free ends 38 and 18 at temperatures under their softening point and in short time periods The preferred practice of the invention calls for low plastic temperature upon curling but using a curling tool 50 at high temperature to minimize the resultant softening of the curled convex surface of free end 18 as heretofore discussed in FIG. 4, while maximizing the softening of the curled convex surface of free end 38 which is insulated from tool 50 by the free end 18.

Thus, it can be seen that the curling method of the invention used to create the desired curled shape and for urging of the curled free ends 38 and 18 together for superior joining and sealing performance, also modifies the physical properties of the plastic at at least one of the sealing surfaces from those of a more rigid, unyielding material suitable for overall container strength and integrity to those of a softer, more yielding and conformable material suitable for improved sealing characteristics.

It has also been found that the curling method of the invention, also modifies the physical properties to make them tougher so as to provide greater drop impact strength. As shown in FIG. 4, the curled free end 18 includes a stretched surface 31. It is believed that by producing the curled portion 48 at low plastic temperatures and at high rates, molecular monoorientation is produced in the stretched plastic surface 31 which toughen and strengthen it in the curl direction. Also, in most circumstances, molecular orientation in one direction is accompanied by a strengthening in that direction but a weakening in the normal direction, the combined effect of which is to produce a weakening when impacted on its planar surface. However, in the practice of the invention when the curl is produced inwardly, the plastic in stretched portion 31 is in a state of elastic compression in the hoop direction (normal to the monoorientation) which strengthens and serves to offset the loss of strength typically encountered with monoorientation. Additionally, the substrate portions of curled free end 18 is also in a state of elastic compression both circumferentially and in the curl direction which also serves to increase strength and toughness of the substrate. The result is an increased toughness and impact strength resulting from the development of monoorientation in combination with compression of the plastic normal to the monoorientation. This toughness is further enhanced by the state of elastic compression of the substrate of the monooriented portions.

Thus it is that the method of the invention which produces an urging of the free ends 38 and 18 into a tightly coiled shape and subsequently against one another, as well as a softening of one of their abutting surfaces to produce a tighter joining and greater sealing integrity also produces a curled portion 48 with greater toughness and drop impact strength, thereby permitting the rigorous use of plastics of lower impact strength such as non-bioriented polyethylene terephthalate.

For typical free end thicknesses of up to 0.025 inches, the preferred practice of the invention calls for short curling time (e.g. two-tenths to four seconds) and low plastic temperature prior to curling but using a curling tool 50 which may be at a high temperature so that during curling the outside surface 31 of free end 18 is softened, but only slightly, so that high stress levels can be developed in the free ends. It also calls for an optional short dwell time at the end of the tool stroke to preferentially heat Segment A of the curled free end 18 to reduce stress thereat. In this way the restraint imposed on Segment F of curled free end 18 by Segment A in FIG. 4 is reduced and the radial sealing pressure outwardly of Segment F on curled free end 38 increased. Because the curled free end 38 is insulated by the curled free end 18 during such a dwell, its stress levels and performance is minimally affected. Optionally the dwell period for the curling tool 50 can be replaced by a secondary operation which preferentially heats Segment A of the curled free end 18. Thus the stresses and related elastic strain and memory produced by the curling method of the invention are employed to urge the curled free ends together to enhance their sealing integrity.

Alternatively or additionally the curling operation may also be facilitated by vibrating or rotating the tool 50 so that the free end 18 slides more readily over the working surface 52 and/or frictional heat is developed therein. Or the can end 32 may be rotated relative to the can body 12 before or during the curling to heat both free end 38 and 18 to facilitate the curling operation, to promote their intimate sealing contact, or to physically weld the ends to one another.

Preferably the free ends 18 and 38 have different levels of mechanical strength so that one free end will be shaped by and in more intimate contact with the other. The differential in mechanical strength of the free ends can be accomplished by employing free ends of different thicknesses, length, taper or by temperature or by different plastics including the same plastic having different strength characteristics as a result of orientation, crystallization, internal stress or other altered states.

Further the container body may include a wholly different polymer than the container end or may include different ingredients such as flow or slip aids in a similar polymer.

In forming the can body of the invention, processes such as the seaming of sheet or the use of extruded sleeves to which can ends are affixed, may be used in practicing the present invention. Also, the can body may be produced as a unit by injection molding, blow molding including stretch blow molding, thermoforming including solid phase pressure forming, various forms of compression molding including impact molding by traditional metal forming processes such as draw-and-iron, or other means. The can end can also be formed by processes such as injection molding, thermoforming including solid phase pressure forming, various forms of compression molding including impact molding, blow molding or other means.

The container body or end may also include laminar composite constructions including paper, metal films or other materials which are used at low enough levels so that the curl formability of the free ends is sufficient to produce the curled seams of the invention.

The described body end portion and seam of the present invention can be used for either the top or bottom of the container, and the top or lid of the container can be opened by conventional opening means. Also an overcap can be provided for reclosing the container, such as a snap overcap lid which can cooperate with the seam of the container for reclosing. Further, the containers of the invention can be provided with overcaps (e.g. snap or threaded caps) from the outset so that the end portions may be considered as seals or indicators of the condition of the containers for tamper evident purposes, or both.

In addition the cross sectional configuration of the curled free ends can be less than a full 360° curl (coiled or O shaped). For example, the configuration of the curled free ends can be a J or U depending the demands placed upon the container. In the instance of carbonated beverages a coiled cross sectional shape is preferred whereas for powders and the like the cross sectional shape of the curled free ends can be a J or U.

The containers of the present invention can be used to contain a wide variety of products including:

beverages, including fruit juices, carbonated soft drinks and pasteurized beverages such as beer;

and foods, especially those which are hot packed, retorted or intended to be microwaved in the container and including vegetables, meat products, soups and other processed foods.

Further, the shape of the containers may be other than generally cylindrical and may include oval or square horizontal cross sections and tapered, curved or otherwise sculptured vertical cross sections.

Referring now to other embodiments of the invention, FIGS. 11 and 12 illustrate an embodiment including a curled portion which is prestressed so that its hoop compression and seal integrity is enhanced. This is accomplished, for instance, in the method shown in FIGS. 7 to 9A by a slight outward displacement of the groove 52 of tool 50 so that the free ends 38 and 18 are not only deformed downwardly in the curl shape but also outwardly to circumferentially and elastically stretch the uncurled portions of the free ends 82 and 83 so that when the curled portion 48 is removed from the curling tool 50 as shown in FIG. 12, the uncurled portions 82 and 83 of the free ends elastically recover to increase the level of hoop stress and radial urging of the curled and uncurled portions of the free ends against one another. In this embodiment the free ends 38 and 18 may be beveled outwardly so that initial engagement of at least the lip 19 with the tool 50 may be on the beveled portion 59 to facilitate curling.

Referring now to the other illustrative embodiments of the inventions, FIGS. 13 to 15 show another embodiment of the invention where the double walled curled portion 48 which joins and seals the can end 32 to the can body 12 is crimped in a subsequent operation. FIG. 13 shows the can 10 of FIGS. 1 to 9 having a curled portion 48 including spaced vertical indentations 46 around its internal periphery produced by crimping. The indentations 46 create a tighter curled portion 48 thereat to reduce any tendency to uncurl in use. FIGS. 14 and 15 show a tool 54 and a method to produce the crimping. The tool 54 has a central portion 54A having spaced vertical projections around its lower periphery and a ring portion 54B concentrically spaced from it. During the crimping operation the ring portion 54B is moved downwardly in peripheral abutment with the outer wall of curled portion 48 while the tool central portion 54A is forced in peripheral engagement with the inner wall of curled portion 48 thereby creating indentations 46 by the tool projections 57. In addition the central tool portion 54A can be heated so that the projections 57 melt the plastic to create welds at the indentations 46 to further enhance its resistance to uncurling in use. Or less elevated temperatures may be used which simply soften the plastic to produce more pronounced indentations and a tighter curled portion 48 thereat. In another embodiment the crimping tools 54A and 54B may be separate parts of the curling tool 50 and the crimping operation may be combined with the curling operation as a sequential step. Additionally the crimping may be located on the outer periphery of the curled portion 48. Also the tools 54A and 54B may be replaced by rollers to produce the vertical indentations 46.

FIGS. 16 and 17 illustrate another embodiment of the invention whereby the double walled curled portion 48 is creased circumferentially in a subsequent operation to increase the tightness of the curl and to resist any uncurling tendency in use. FIG. 16 shows the can 10 of FIGS. 1 to 9 having a curled portion 48 including a circumferential indentation 44. FIG. 17 shows the tool 56 to produce the indentation 44 having a cylindrical central portion 56A and a peripherally spaced portion 56B including a radially movable segment 55 in full engagement with the curled portion 48. The segment 55 which may be heated, has a sharply curved tip 58 which deeply impresses the curled portion 48 to produce the crease 44 while the tool portion 56B is rotated. The sharp crease 44 more effectively overcomes the elastic memory of the plastic curled portion 48 than a flattening operation typically employed after roll curling, thereby producing a tighter structure and seal. Optionally, the tool portion 56B and its segment 55 may be replaced by a roller to produce the circumferential crease 44 or the moveable Segment 55 may be included in the central tool portion 56A.

FIGS. 18 and 19 show how, the curled portion 48 may be compressed in an operation directly after curling by employing the curling tool 50. FIG. 18 shows the curling tool 50 after the curled portion 48 has been formed including a central component 50A and a peripheral component 50B with an annular groove 52 at their interface having a beveled portion 59. FIG. 19 shows the subsequent axial movement of tool component 50B which may be heated while the curled portion 48 is still contained in the groove 52 to compress it thereby increasing its tightness and resistance to uncurling in use.

Referring now to FIGS. 20 to 25 there is shown an embodiment of the invention wherein a peripheral configuration is provided adjacent the free ends 38 and 18 which cooperates with the curled portion 48 to enhance its sealing and integrity when used in conjunction with a pressurized product. Shown in FIGS. 20 and 21 is an assembly of a can end 32a and body 12a prior to curling wherein the can end 32a has a downwardly concave lid portion 34a and a peripheral free end 38 with a transitional portion therebetween including a generally vertical wall 35, and a generally horizontal portion 13 in turn including a vertically extending wall 43 with an overhanging lip 39 inwardly displaced from the free end 38 to define a J shape recess 36a. Recess 36a includes a peripherally extending side wall projection 42b and a similar bottom projection 42a. The underside of horizontal portion 13 includes a peripheral recess 21 having a bearing surface 23. The can body 12a has a peripheral free end 18 and a side wall 14 with a transitional portion therebetween including a generally vertical portion 30 and a generally horizontal portion 15 with a lower bearing surface 20 and an upper peripheral projection 17 for engaging the lower peripheral recess 21 of can end 32a. FIGS. 20 and 21 show the can end and body assembly in axial operable relationship with a curling tool 50a which is comprised of a central cylindrical portion 51a and a separate concentric portion 51b. The tool 50a includes a peripheral groove 52 which engages the free ends 38 and 18 as shown in FIGS. 21 to 24 which illustrate the method of curling the free ends 38 and 18. In FIG. 21 body free end 18 is first contacted by the beveled portion 59 of the groove 52. As tool 50a continues its axial travel the free ends curl in the manner described in FIGS. 6 to 8A. However when inner tool component 51a meets the lip 39 of recess wall 43, it stops its travel while tool component 51b completes the curl formation, as shown in FIGS. 23 and 24. In this embodiment the tool 50a is heated so that the outside surface 31 of body free end 18 is sufficiently softened as it contacts the tool groove 52 that when the tool stroke is completed and the curl portion 48a is in full compression within the can end recess 36a, the recess projections 42a and 42b will be impressed into the surface 31 of free end 18. In this final curled relationship the curled portion 48a and its adjacent transitional portions 13 and 15 are configured to employ internal pressure to enhance sealing integrity. The normal response by the curled free ends 38 and 18 to the upward force created by internal pressure is to resist their uncurling by relying on their flexural strength and frictional engagement, and the restraint of overhanging lip 39. This embodiment reduces the requirement for flexural strength by enhancing their interlocking and frictional engagement. As internal pressure forces the can end lid 34a and vertical wall 35 upwardly, it forces the inner segment 9 of horizontal portion 13 upwardly which then serves to lever portion 13 against the downward restraint of the curled body free end 18. The response to such forces and leverage is to push the body free end 18 upwardly in an uncurling action and to pull the can end free end 38 inwardly in a related uncurling action. However the engagement of the can end lower recess 21 and its bearing surface 23 with the body upper projection 17 restrains relative horizontal movement thereat and prevents uncurling of can end free end 38 while at the same time provides a fulcrum or pivot so that upward force on segment 9 of portion 13 serves to force its recess vertical wall 43 into compression with the curled portion 48a thereby enhancing the frictional engagement of its curled free ends 38 and 18 as well as enhancing the engagement of the projections 42a and 42b with the impressions produced by them in the surface 31 of free end 18 during curling, thereby restraining uncurling and upward displacement of the body free end 18. In this manner internal pressure is employed to enhance the integrity of the curled portion 48 by maintaining a continuous force on it which serves to lock its components into a tight sealing engagement.

Referring now to FIGS. 26 and 27 there is shown a preferred can end 32b of the invention having an upwardly concave lid 34b with radial depressions or lines of weakness and a peripheral upwardly concave recess 36b having a free end 38 with a lip 40. The peripheral concave recess 36b has an inner wall 43 and lip 39. As shown, the recess 36b is concave and forms a groove about the lid 34b which is below the upper periphery of the lid 34b and the lip 39. In cross section the walls of the groove 36b and free end 38 form an inwardly configured J shape integral with the lip 39 of the lid 34b. FIGS. 28 and 29 show the can end 32b of FIGS. 26 and 27 joined in a sealing engagement with the can body 12 of FIG. 1 using the method described in FIGS. 7 to 9. The double wall curled portion 48 is located in the peripheral lid recess 36b which acts to receive the lips 19 and 40 and their adjacent free ends 18 and 38 during the curling operation where it cooperates with the curling tool 50 to form the curled portion 48. Thereafter the recess 36b and its inner wall 43 holds the curled portion 48 firmly in place while resisting any tendency for it to uncurl. The lip can also overhang the curled portion 48 as shown in FIG. 29, to facilitate this restraint. Additionally, the inner wall 43 is employed advantageously to positively transmit internal pressure within the can against the curled portion 48 to hold it firmly in a sealing engagement within the concavity 36b. This comes about from the fact that the inner wall 43 extends to and above the midpoint 41 of the cross section of the portion 48 indicated by the dotted line, and from the fact that pressure can be transmitted from the interior of the container directly to the curled portion 49 at and above said midpoint 41 through the inner wall 43 (see FIG. 29). In addition forces developed in the lid portion 34b by internal pressure further enhance the compression of the curled portion 48 as a result of leveraging the pressure applied to it upwardly to develop a significant outward thrust bearing on the overhanging lip 39 and thereby on the recess wall 43. This action is significantly enhanced by the incorporation of radially directed depressions 45 in the lid portion 34b which serve to reduce its hoop strength without substantially diminishing its radial strength so that the lid portions 37 between the depressions 45 are more readily, but uniformly, deflected axially by internal pressure and thereby produce a greater amount of radial deflection of the periphery of lid portion 34b, lip 39 and, in turn, on the inner wall 43 of the recess 36b and finally on the curled portion 48.

Alternatively as shown in FIGS. 26 and 29 sealant 61 may be applied to the recess 36b prior to curling so that the lips 19 and 40 will carry it to and fill the central void 68 of the curled portion 48 as well as distribute it along the interface of the free ends during the curling operation (see particularly FIG. 29).

FIG. 30 shows how a peripheral weld 64 may be produced between the can body 12 and the can end 32b of FIGS. 28 and 29 at the curled portion 48 to thereby further prevent its uncurling in use and to provide a positive seal therebetween. The peripheral weld 64 is produced by melting the plastic at the interface 64 of the inner wall 43 of the recess 36b with the curled portion 48 through frictional heat developed by engaging the annular projection 62 of welding tool 63 with the interface 64 and rotating it until enough frictional heat is developed thereat to melt the plastic whereupon the tool 63 is withdrawn and the weld formed. Also, other means may be used to weld the can body 12 to the can end 32b before, during or after the formation of the curled portion 48, including the use of heat developed by friction including spin welding, wave energy, or direct contact with a heated surface or chemically or adhesively bonding. Welds or bonds may also be effectively produced at and between the lips 19 and 40 or along the free ends 18 and 38 before their curling.

FIG. 31 shows how the can end 32b of FIGS. 26 and 27 may be modified to work with the can body 12 of the invention when the can is used with an internal vacuum. In this embodiment the can end 32c has a lid 34c which is convex and a transition portion or lip 39 which is located above the midpoint of the curl 48 so that the downward pressure on its surface creates a leveraged radial thrust of its peripheral transition portion 39 bearing on the curled portion 48 located within the concavity 36c, an action which is facilitated by the radial depressions 45 as described in FIGS. 26 to 29.

FIG. 32 illustrates another embodiment of the can end 32 of the invention for use with vacuum packaged products. In this embodiment the can end 32d is configured as in FIG. 31 except that the lid peripheral transition portion 39a directly abuts the body free end 18 adjacent the side wall projection 16. When such a can end 32d is joined to can body 12 as previously described and is subject to the stresses of an internal vacuum the surface of the lid 34d is thrust downwardly creating a leveraged thrust radially on its periphery 39a to significantly increase its sealing pressure directly on the can body projection 16 and the adjacent can body free end 18 below the curled portion 48. Another feature of the invention for vacuum packed products is illustrated in FIG. 32 wherein sealant 61 is applied to the crevice 64a formed by the curled portion 48 and the can end 32d prior to cooling of the container after autoclaving or hot filling so that upon cooling and the development of an internal vacuum the sealant 61 will be drawn into the crevice 64a wherever a leak exists thereby assuring the sealing integrity of the curled portion 48.

FIGS. 33 to 39 illustrate another embodiment of the invention wherein the hoopwise free end restraint of the invention is employed to curl horizontal free ends of a can body and can end. FIGS. 34 and 36 show the can end 32e with its horizontal free end 88 in juxtaposition with free end 78 of can body 12. The can end and body assembly is shown disposed in radial curling tool 101 engaged by axially operable upper mandrel 103 and lower pedestal 105. The free ends 88 and 78 are positioned within die 107 which is composed of segments 107a, 107b, 107c and 107d in a relationship suitable for curling. The die 107 may be heated by elements 108 to facilitate the curling. Mandrel 103 engages the upper surface of can end 32e so that its first bearing surface 109 abuts and supports the vertical, transitional, peripheral wall 90 between the can end lid portion 85 and its free end 88 as shown in FIGS. 34 and 36. FIGS. 36 and 37 show the curled portion 84 being produced by the die 107 and its curved workingsurface groove 114. In FIG. 36 the die groove 114c has begun to radially engage the can end free end lip 89. It continues to compress the can end free end 88 and the body free end 78 about their perimeters, forcing them downwardly and then inwardly into a C shape. Upon further radial compression, the free ends are compressed from the groove 114 and they curl upwardly and outwardly in response to the strain and elastic memory developed therein by the curling and by engagement with the wall 81 of the body recess 80 thereby producing the desired double wall curled portion 84 shown in FIG. 37. FIG. 38 shows how the curled portion 84 can be "supercurled" or "overcurled" to achieve deformation of the walls 90 and 81 so that when die 107 is withdrawn, any immediate uncurling of the curled free ends 88 and 78 will be matched thereby to maintain a tight sealing engagement between the curled free ends 88 and 78 and the wall 81 of body recess 80. After the curled portion 84 has been produced as shown in FIG. 37, the mandrel 103 is withdrawn slightly from the can end 32e so that its first bearing surface 109 no longer abuts and supports the can end vertical wall 90 but its second bearing surface 111 becomes positioned slightly inwardly from said wall 90. At this junction, as shown in FIG. 38, the die 107 continues to move inwardly forcing the curled portion 84 to assume a lesser diameter, thereby overcurling the curled free ends 88 and 78 as well as reducing the diameter of the walls 90 and 81 which are brought to their compressive elastic limit. Subsequently when the die 107 is removed from curled portion 84, as shown in FIG. 39, the walls 90 and 81 will elastically recover radially to offset the radial elastic recovery of the curled portion 84 and thereby maintain a tight sealing contact.

In the practice of this embodiment, rotational movement and engagement may be introduced between die 107 and free ends 88 and 78 to assure a continuous hoopwise restraint of the free ends 88 and 78 during curling. The number of die 107 segments may be of any appropriate number to assure said continuous hoopwise restraint.

In other embodiments of the invention the multiwall curled portion may include more than two walls. For example, the embodiment of the invention shown in FIGS. 40–43 includes three walls. In FIG. 40 there is shown an assembly of a can end 32f with a body 12f in axial operable relationship with a curling tool 51. The curling tool 51 has a groove 52f with tangential beveled surfaces 59a and 59b. The body 12f has a peripheral upwardly concave recess 36f defined by an external free end 18a, an internal free end 18b and a lower horizontal portion 15. The can end 32f has a peripheral free end 38f which forms a downwardly concave recess 68, a central lid portion 34f and a transitional vertical wall 35 therebetween. In FIG. 40 the tool 51 has begun to engage the lip 19a of body free end 18a in downward compression. In FIG. 41 the tool 51 continues its axial movement which causes the lip 19a and body free end 18a to curl inwardly and then downwardly across its working surface 69 thereby bearing on and sliding against the can end free end 38f causing it to move downwardly in turn bearing on the lip 19b of body free end 18b to cause it to also curve outwardly and then downwardly. In FIG. 42 we see the tool 51f with its downward stroke completed and the body free end 18b in intimate outwardly co-curled sealing engagement within the curled can end free end 38f which in turn is in intimate co-curled sealing engagement with the inwardly curled body free end 18a. In this manner, as shown in FIG. 43, the sealing integrity of co-curled free ends 38f and 18b is enhanced by a third free end which serves to reinforce and restrain them from uncurling or otherwise being forced apart. Preferably, in addition to the described multiwall configuration, the plastics of the curled free ends include the previously detailed stress and related strain and memory.

As shown in FIG. 44, the can body and end configurations of FIGS. 40 to 43 may be largely retained and a double wall curl may be produced by the method of FIGS. 40 to 42, wherein the free end 18a may be of lesser length, and even mostly removed as shown in FIG. 44 to leave the recess 36f, the free end 18b and the horizontal portion 15 on can body 12b to produce an outwardly directed double wall curl with the can end 32f.

Figure 45:
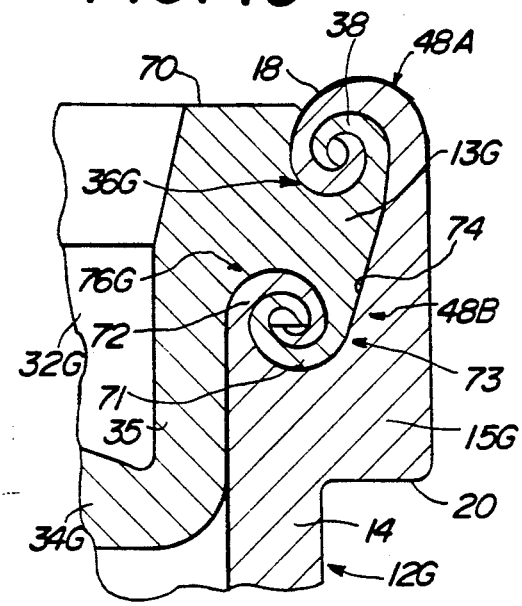

Referring now to FIGS. 45 to 48 there is illustrated another embodiment of the invention wherein two curled portions are produced to further enhance the joining and sealing integrity between the container end and body. As shown in FIG. 45 the can end 32g includes a lid portion 34g with a transitional peripheral vertical wall 35 and a horizontal portion 13g including an upper bearing surface 70, an upper recess 36g, a lower recess 76g, an upper curled free end 38 and a lower curled free end 71. The can body 12g has a wall 14; an upper horizontal portion 15g including an upper recess 73 bounded by a beveled wall 74 and a lower free end 72 also curled within the recess 73 and engaging the can end lower free end 71; a lower bearing surface 20; and a curled upper free end 18 engaging can end upper free end 38.

Figure 46:
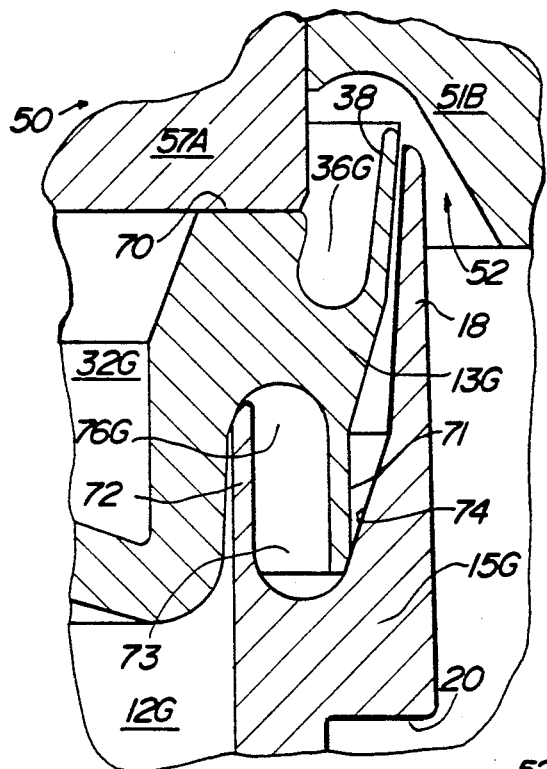
Figure 48:
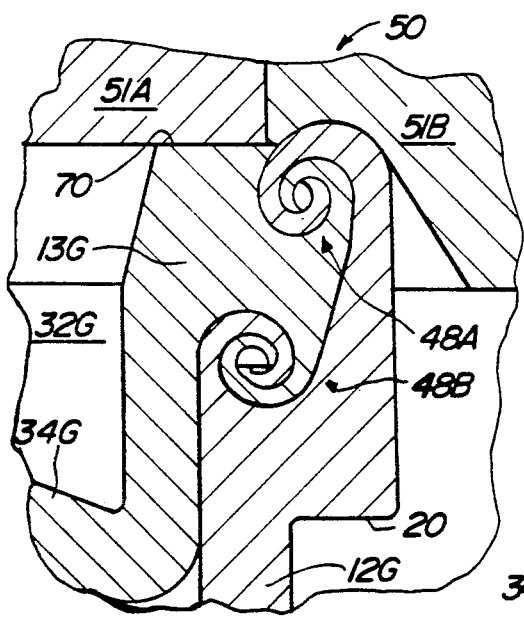
Figure 47:
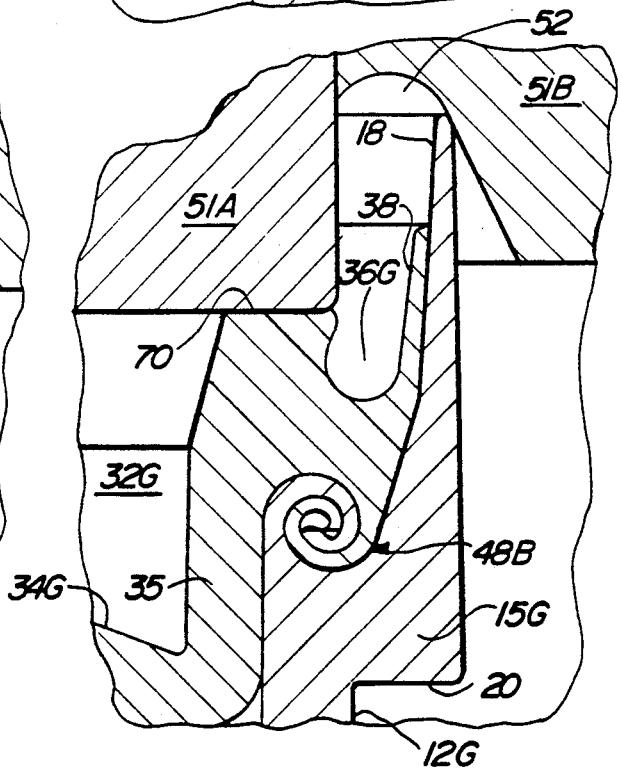

The method for producing twin curled portions 48a and 48b of FIG. 45 is illustrated by FIGS. 46 to 48. In FIG. 46 the can end 32g is assembled with body 12g in axial alignment with curling tool 50 which consists of a cylindrical central portion 51a and a peripheral portion 51b having a curling groove 52. The central tool portion 51a is in initial contact with the can end bearing surface 70. The can end lower free end 71 is in engagement with the body recess bevelled wall 74 and the body lower free end 72 is in contact with the can end lower recess 76g. As the central tool portion 51a continues its downward travel it forces the can end free end 71 into the body recess 73 and curls it inwardly while the wall of its lower recess 76g engages the body lower free end 72 and curls it outwardly. Continued travel of central tool portion 51a then produces the co-curled engagement of free ends 71 and 72 to produce the curled portion 48b, shown in FIG. 47, which joins and seals the end 32g and body 12g in the manner of the invention. In a separate, coordinated tool action the concentric tool portion curling groove 52 compresses the free ends 18 and 38 inwardly thereby co-curling them in the manner of the invention to produce upper curled portion 48a as shown in FIG. 48. Preferably, in addition to the two curl multiwall configuration, the plastics of the curled free ends include the described stress and related strain and memory.

Figure 49:
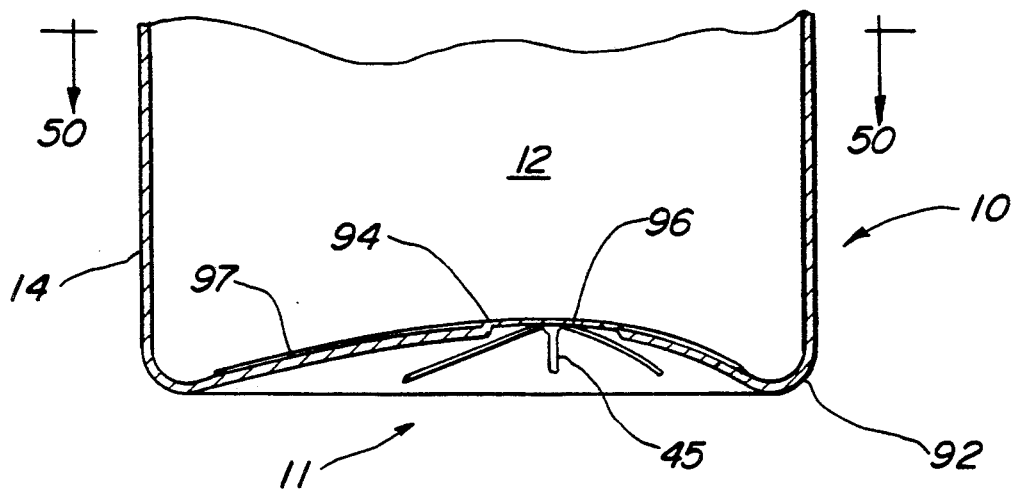
FIG. 49 is a longitudinal sectional view of the container body of FIG. 1, taken along the lines 49—49 thereof, and wherein the bottom of the container is domed and includes lines of weakness or depressions for flexing of the domed portion.
Figure 50:
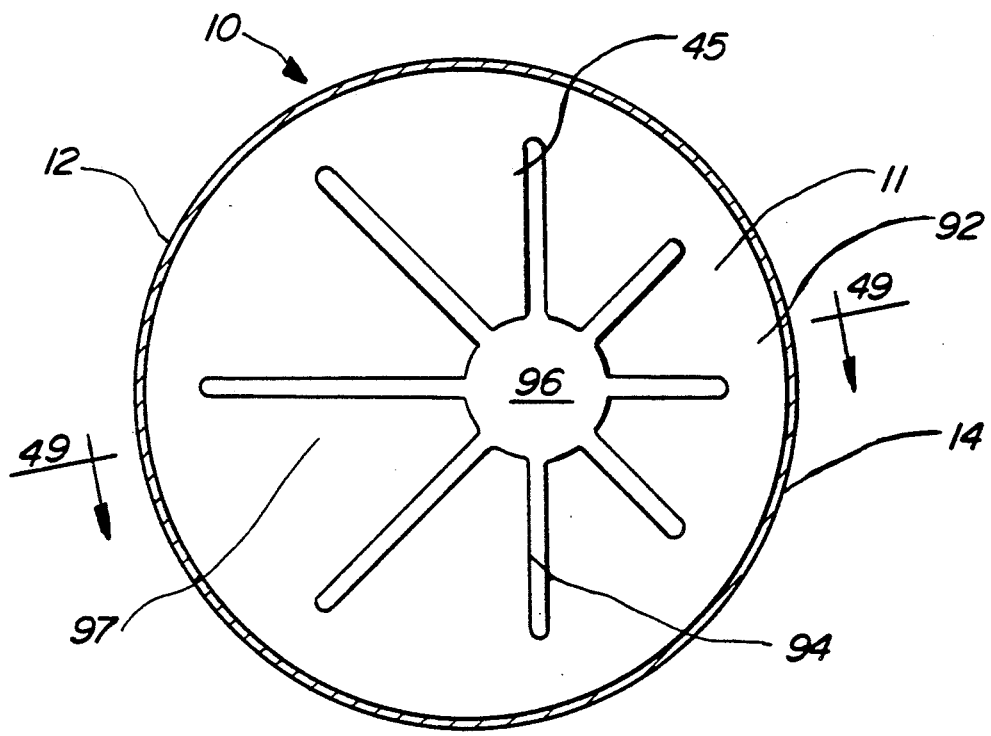
FIG. 50 is a plan view of FIG. 49.

Referring now to FIGS. 49 and 50 there is generally shown that the container 10 of FIGS. 1 and 2, can include an inwardly domed integral bottom 11. In addition, these figures illustrate an embodiment of the invention wherein the bottom 11 of container 10 is shaped to facilitate its easy reinversion after inversion when subjected to uniformly applied pressure as often encountered during or after hot filling and retorting. In this embodiment the bottom 11 is an integral part of can body 12 and has a curved transitional portion 92 therebetween and the central domed portion 94. The top 96 of the domed bottom portion 94 is located off center so that it has a greater span 97 in one direction than in other directions thereby creating an imbalance and a weakness to its structure thereat and a lesser resistance to uniformly applied forces which create inversion (i.e. internal vacuum or pressure). When internal pressure within the can 10 builds up as when heated, the span 97 is easily pushed downwardly and once this occurs the remainder of the bottom 11 easily continues the inversion. When the container is cooled to ambient temperature and an internal vacuum is developed, the bottom 11 responds and reinverts itself readily, again because of its asymmetrical shape and its reduced structural strength. Alternatively the function of the bottom 11 and its ability to invert and reinvert readily can be achieved by creating a flat cross section or a reverse curvature to a segment of an otherwise symmetrical dome shape, thereby creating the weakened structure even when the top 96 is not off center. Another embodiment achieves the weakened structure to uniformly applied pressure by the inclusion of radial lines of weakness which reduce the hoop strength of any domed structure. The lines of weakness may be the result of thinner walls, wall corrugations or other suitable means. As illustrated in FIGS. 49 and 50, radial lines of weakness 45 can be continued across the central, top portion 96 to create a lower resistance to inversion. While both of the aforementioned means to create a structural weakening, and thereby a lessened resistance to inversion, may be employed independently, they may also be employed simultaneously as shown in FIGS. 49 and 50 to achieve optimum results. In yet another embodiment of the invention the inversion weakened construction of FIGS. 49 and 50 may be employed on the container side wall or its top or lid portion. In still further embodiments of the invention the dome shape of FIGS. 49 and 50 may be truncated or have a base of another shape than circular, such as square or rectangular. In all cases, the inversion weakened feature is configured so that it more easily inverts when subjected to a uniformly applied force against its surface.

Also, the weakened portion 94 can be employed as a vacuum indicator for hot filled containers. For example, the dome 94 can be outwardly directed when filled and inwardly directed when a given level of internal vacuum is developed on cooling. Further, the resistance to inversion may be varied by varying the shape or numbers of such features to correspond to various levels of vacuum in a plurality of such portions 94 to indicate the various levels of vacuum developed within the container. While FIGS. 49 and 50 generally illustrate an integral domed bottom 11, the container or cans of the invention may have a variety of end configurations, including a double wall curled plastic end as described and shown herein at each end of the container or can.

Thus, the invention in its broader aspects is not limited to the specific described embodiments and departures may be made therefrom within the scope of the accompanying claims without departing from the principles of the invention and without sacrificing its chief advantages.

What is claimed is:

1. A container comprising:
a body having a free end of plastic,
and an end portion having a central portion and a free end of plastic about its perimeter, and
said free ends being in juxtaposition and continuously flexed to provide a curl to form a plurality of curled walls which are joined together as a seam, wherein at least one of said curled free ends includes internal stresses and related strain and memory along its length for providing a seam of integrity and reliability by maintaining engagement therebetween wherein during curling at least one of the free ends are maintained at a temperature below its Vicat softening point.

2. The container of claim 1, wherein each of said curled free ends includes internal stresses and related strain and memory for providing a seam of integrity and reliability by maintaining engagement therebetween.

3. The container of claim 1, wherein said curled free ends have a cross sectional shape of a coil.

4. The container of claim 1, wherein said end portion has a central portion and peripheral skirt including said free end.

5. The container of claim 1, wherein said central portion has a concave cross sectional shape.

6. The container of claim 1, wherein one of said free ends is longer than any other free end.

7. The container of claim 1, wherein said body includes an inwardly extending projection spaced from said free end thereof for positioning said end portion with said body.

8. The container of claim 1, wherein the free end of said end portion is force fitted within the free end of said container body.

9. The container of claim 1, wherein the uncurled portions of said free ends apply hoop stresses to said curled free ends to increase the urging of the curled free ends together.

10. A container comprising:
a body having a free end including plastic,
an end portion having a central portion and a free end about its perimeter including plastic, and
said free ends being tapered, juxtaposed and curled to form a plurality of curled walls which are joined together as a seam, wherein at least one of said curled free ends includes internal stresses and related strain and memory for providing a seam of integrity and reliability by maintaining engagement therebetween.

11. A method of forming a container having a body and an end portion with free ends about their perimeters, wherein the free ends include a plastic and are adapted to be curled, comprising:
juxtaposing the free ends,
maintaining plastic in at least one of the juxtaposed free ends at a temperature which is below its Vicat Softening Point at the time of curling of the free ends so that at least one of the free ends can develop stress and related elastic strain and elastic memory during curling, and
concurrently and circumferentially engaging at least one of the juxtaposed free ends about its perimeter with a die and progressively curving the juxtaposed free ends into a multi-wall curled configuration wherein plastic in at least one free end maintained at a temperature below its Vicat Softening Point during curling develops stress and related strain and elastic memory to thereby produce and maintain engagement therebetween after disengagement between the die and the perimeter of the juxtaposed curled free ends.

12. The method of claim 11, wherein the end portion is formed with an upper free end and a lower free end and the body has a transitional recess adjacent its free end, and
wherein the upper free end is concurrently curled with said body free end to produce said multiwall curled configuration and the lower free end is engaged by said body recess to curl and produce a sealing engagement therewith.

13. The method of claim 11, wherein the body is formed with an outer free end and an inner free end and the end portion has a lower transitional recess adjacent its free end, and
wherein the outer free end is concurrently curled with said end portion free end to produce said multiwall curled configuration and the inner free end is engaged by said end portion recess to curl and produce a sealing engagement therewith.

14. A method of forming a container having a body and an end portion with free ends about their perimeter, wherein the free ends include a plastic and are adapted to be curled, comprising:
juxtaposing the free ends,
maintaining plastic in at lest one of the juxtaposed free ends at a temperature which is below its Vicat Softening Point at the time of curling of the free ends so that at least one of the free ends can develop stress and related elastic strain and elastic memory during curling, and
concurrently engaging at least one of the juxtaposed free ends about its perimeter with a die and progressively curving the juxtaposed free ends as at least the engaged free end moves along and away from the engaging portion of the die wherein engagement with the die causes the development of stress and related strain and elastic memory in the plastic in at least one of the free ends while said free end is maintained at a temperature below its Vicat Softening Point, whereupon the stress and related strain and elastic memory in at least said one free end urges the free ends to continue to curl into a multi-wall curled configuration as the engaged free end moves away from the die to thereby produce and maintain sealing engagement therebetween.

15. The method of claims 11 or 14, wherein the plastic of the free ends comprises polymers, and wherein the physical characteristics of the polymer in at least the one of said free ends is alterable by producing stress and related strain and memory therein as the free ends are curled.

16. The method of claims 11 or 14, comprising progressively curling the free ends inwardly and vertically.

17. The method of claims 11 or 14, comprising progressively curling the free ends outwardly and vertically.

18. The method of claim 17, wherein the curled free ends have a cross sectional shape of a coil.

19. The method of claims 11 or 14, comprising tapering the free ends to control compression thereon and to facilitate curling thereof.

20. The method of claims 11 or 14, comprising forming the body with an inwardly extending projection spaced from the free end thereof for positioning the end portion with the body.

21. The method of claims 11 or 14, comprising forming the free ends of the body and end portion with different levels of elastic strain in the plastic materials for intimate contact between the free ends in the curled configuration.

22. The method of claims 11 or 14, comprising heating at least the outer free end as the free ends curl.

23. The method of claims 11 or 14, comprising crimping, creasing or compressing the curled free ends of the body and end portion.

24. The method of claims 11 or 14, comprising bonding the free ends of the body and end portion prior to or after curling.

25. The method of claims 11 or 14, comprising forming the free ends of the body and end portion in a direction which is substantially along the longitudinal axis of the body.

26. The method of claims 11 or 14, comprising forming the free ends of the body and end portion in a direction which is substantially radial to the direction of the longitudinal axis of the container.

27. The method of claims 11 or 14, comprising bonding the curled free ends to the body of the container or to the central portion of the end portion.

28. The method of claims 11 or 14, comprising forming a concave recess between the free end and central portion of the end portion which abuts and restrains the curled free ends.

29. The method of claims 11 or 14, comprising forming a concave recess between the free end and central portion of the end portion which exerts a compressive component against the curled free ends.

30. The method of claims 11 or 14, comprising forming the central portion with a concave configuration which can be flexed upwardly by internal pressure to exert a compressive component against the curled free ends.

31. The method of claims 11 or 14, comprising forming the central portion with a convex configuration which can be flexed downwardly upon vacuum packaging to exert a compressive component against the curled free ends.

32. The method of claims 11 or 14, comprising forming the central portion with a convex configuration which can be flexed downwardly to exert a compressive component against a transitional portion between the can body and its free end.

33. The method of claims 11 or 14, comprising forming a curved central end portion having radial depressions or liens of weakness so that the central portion of the end portion can exert a compressive component on the curled free ends in response to a pressure differential thereon.

34. The method of claims 11 or 14, further comprising:
circumferentially and elastically stretching uncurled portions of the free ends as the free ends are curled so that upon completion of curling the uncurled portions of the free ends elastically recover and further urge the curled free ends together.

35. A method of forming a container having a body and an end portion with free ends about their perimeters, wherein the free ends include a plastic and are adapted to be curled, comprising:
forming the body having an opening therein and the free end;
forming the end portion including a central portion, a wall about the perimeter of the central portion, a free end about the end portion and spaced from the wall portion, and a transitional portion between and connected to the wall and free end forming a recess therebetween,
juxtaposing the free ends of the body and end portion to form a plurality of walls therebetween,
maintaining plastic in at least one of the juxtaposed free ends at a temperature which is below its Vicat Softening Point at the time of curling of the free ends so that at lest one of the free ends can develop stress and related elastic strain and elastic memory during curling, and
concurrently and circumferentially engaging at least one of the juxtaposed free ends about its perimeter with a die and progressively curving the juxtaposed free ends into a multi-wall curled configuration in the recess of the end portion, and wherein plastic in at least the one free end maintained at a temperature below its Vicat Softening Point during curling develops stress and related strain and elastic memory to thereby produce and maintain engagement therebetween after disengagement between the die and the perimeter of the juxtaposed curled free ends.

36. The method of claim 35, wherein the free end of the body is longer than the free end of the end portion, and wherein the free end of the body is the outer wall of the juxtaposed free ends.

37. The method of claim 36, wherein the outer free end of the body is heated to soften its outer surface as the free ends are curled.

38. The method of claim 37, wherein the walls forming the recess in the end portion includes annular projections therein which produce complementary indentations in the softened outer surface of the free end of the body when the free ends are curled.

39. The method of claim 35, further comprising forming the body with a wall about the opening and a transitional portion between and connected to the wall and free end, wherein the transitional portions of the body and end portion are formed with at least one complementary projection and groove which are brought into engagement with each other as the free ends are curled.

40. A method of forming a container having two components comprising a body and an end portion,
forming one component with inner and outer free ends,
forming the other component with a free end about is perimeter, wherein the free end includes a plastic material and is adapted to be curled,
maintaining plastic in at least one of the juxtaposed free ends at a temperature which is below its Vicat Softening Point at the time of curling of the free ends so that at least one of the free ends can develop stress and related elastic strain and elastic memory during curling, and
concurrently and circumferentially engaging at least one of the juxtaposed free ends about its perimeter with a die and progressively curving the juxtaposed free ends into a multi-wall curled configuration wherein plastic in at least the one free end maintained at a temperature below its Vicat Softening Point during curling develops stress and related strain and elastic memory to thereby produce and maintain engagement therebetween after disengagement between the die and the perimeter of the juxtaposed curled free ends.

41. The method of claim 40, wherein the free end of said other component is curved at its outer end for juxtapositioning said outer end between the free ends of said one component.

42. The method of claim 41, wherein the outer free end of said one component is longer then the other free ends.

43. The method of claim 42, wherein the free end of said other component is adjacent to the inner free end of said one component when the free ends are juxtaposed.

44. The method of claim 43, wherein the curling is accomplished by a die which initially engages and begins to curl the longer outer free end of said one component followed by curling all of the free ends and the longer free end is curled into contact with the curved outer end of said other component.

45. A method of forming a container from two components including a body and an end portion, comprising:
forming one component with inner and outer free ends with a recess therebetween, wherein the free ends include plastic materials and are adapted to be curled,
forming the other component with substantially opposing upper and lower free ends which form recesses with the adjacent portions of said other component, and wherein the free ends include plastic materials and are adapted to be curled,
juxtaposing the free ends of said components wherein one of the free ends of said one component is adjacent the lower free end of the other component for forming lower curled walls, and wherein the other free end of said one component is adjacent to the upper free end of the said other component for forming upper curled walls, and
concurrently and circumferentially engaging at least one of the juxtaposed free ends of each component about its perimeter with a die and progressively curving the juxtaposed free ends into a plurality of lower and upper curled walls, wherein plastic in at least each of the one free end maintained at a temperature below its Vicat Softening Point during curling develops stress and related strain and elastic memory to thereby produce and maintain engagement between the walls after disengagement between the die and the perimeter of the juxtaposed curled free ends.

46. The method of claims 11, 14, 35, 40 or 45, further comprising curling the free ends in a direction which orients the plastic in the outer surface of the free ends in the direction of curling to strengthen said surface.

47. The method of claim 46, wherein plastic in the free ends is placed in compression which also strengthens said plastic.

48. The method of claims 11, 14, 35, 40 or 45, further comprising heating the free ends after curling to reduce stress therein.

49. The method of claims 11, 14, 35, 40 or 45, further comprising:

forming a portion of the container having an inwardly extending dome of plastic with an area of said dome which has less strength that other portion of said dome to facilitate inverting and reinverting of the plastic dome in response to pressure changes within or without the container.

* * * * *